United States Patent
Okamoto et al.

(10) Patent No.: US 6,838,838 B2
(45) Date of Patent: Jan. 4, 2005

(54) POWER FEEDING APPARATUS FOR DISCHARGE LAMP

(75) Inventors: Masashi Okamoto, Hyogo (JP); Minoru Fukuda, Hyogo (JP); Atsushi Takekiyo, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/445,816

(22) Filed: May 28, 2003

(65) Prior Publication Data

US 2003/0222605 A1 Dec. 4, 2003

(30) Foreign Application Priority Data

May 28, 2002 (JP) ....................................... 2002-154130

(51) Int. Cl.[7] ................................................. G05F 1/00
(52) U.S. Cl. ....................... 315/308; 315/291; 315/307; 315/360
(58) Field of Search ................................. 315/291, 307, 315/302, 360, DIG. 7, 308

(56) References Cited

U.S. PATENT DOCUMENTS

| | | | | |
|---|---|---|---|---|
| 4,382,210 A | * | 5/1983 | Buhrer | 315/73 |
| 4,749,913 A | * | 6/1988 | Stuermer et al. | 315/175 |
| 5,434,474 A | * | 7/1995 | Ukita et al. | 315/128 |
| 5,463,287 A | * | 10/1995 | Kurihara et al. | 315/307 |
| 6,075,326 A | * | 6/2000 | Nostwick | 315/307 |
| 6,376,998 B1 | * | 4/2002 | Okamoto et al. | 315/291 |
| 6,605,906 B2 | * | 8/2003 | Okamoto et al. | 315/291 |
| 2002/0167284 A1 | * | 11/2002 | Okamoto et al. | 315/291 |

* cited by examiner

*Primary Examiner*—Thuy Vinh Tran
(74) *Attorney, Agent, or Firm*—Rader, Fishman & Grauer PLLC

(57) ABSTRACT

In a power feeding apparatus, current flowing through the discharge lamp is controlled not to exceed a current limit value. Until the discharge status changes to the arc discharge, the current limit value is a first current limit value, and after that, the current limit value changes to the second current limit value. The first current limit value is 70% of the second current limit value or less, and further, for 0.2 ms or greater, the first current limit value is maintained after the discharge status changes to the arc discharge.

3 Claims, 13 Drawing Sheets

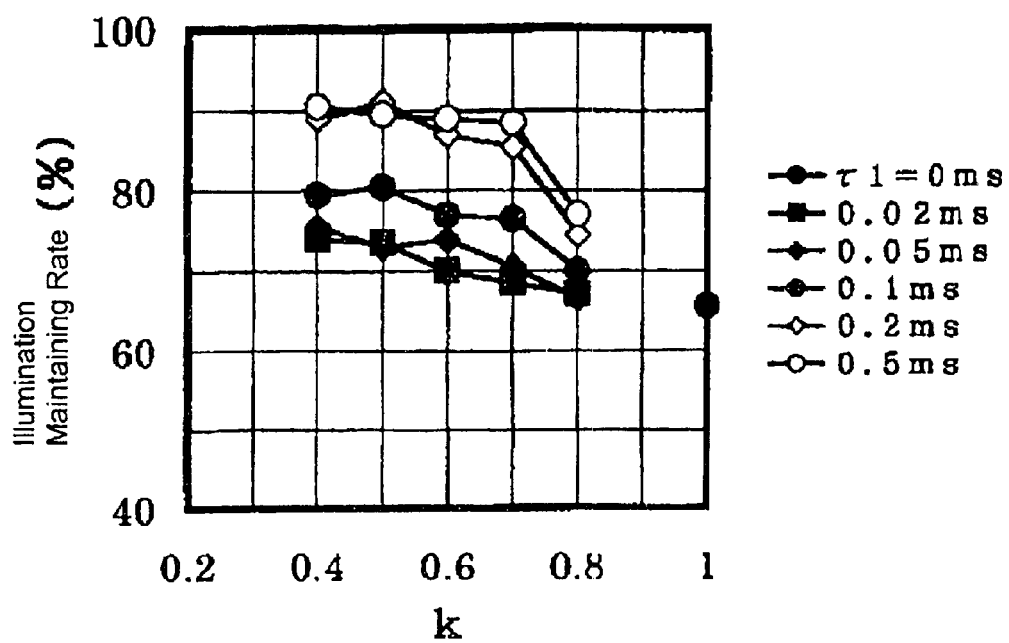
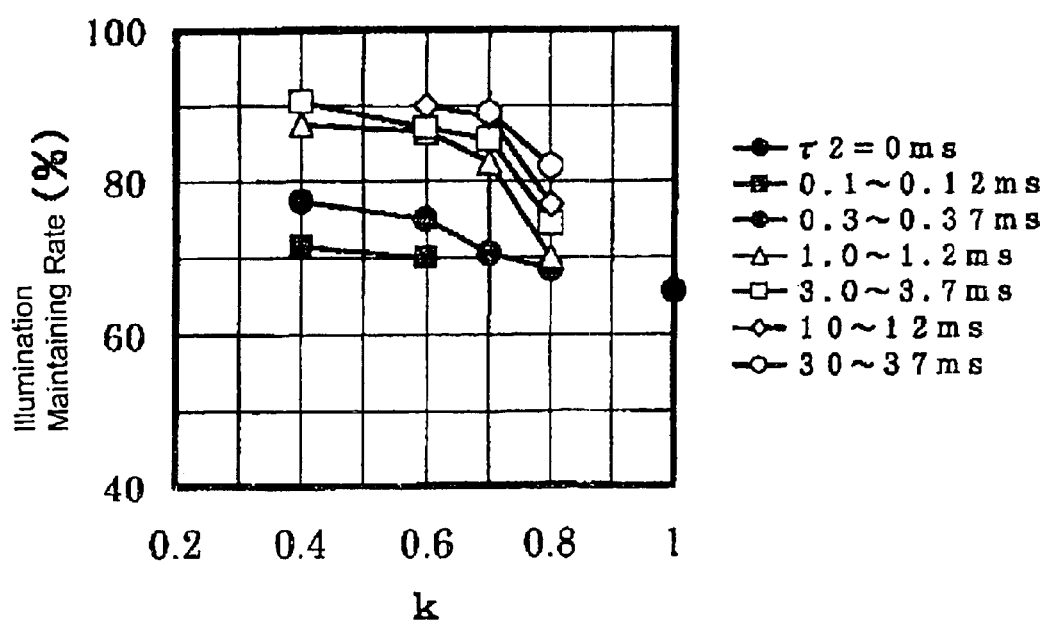

POWER FEEDING APPARATUS FOR DISCHARGE LAMP

TECHNICAL FIELD OF THE INVENTION

This invention relates to a power feeding apparatus for a discharge lamp used as a light source of an optical apparatus such as a projector etc, which turns on a high-intensity discharge lamp (HID lamp) such as a high-pressure mercury discharge lamp or metal halide lamp.

DESCRIPTION OF RELATED ART

A high-intensity discharge lamp is used, in combination with a power feeding apparatus for turning on the high-intensity discharge lamp, for an optical apparatus such as a liquid crystal projector or DLP™ (Texas Instruments Incorporated) projector.

There are two discharge lamp driving methods, that is, a DC driving method in which there is no change of polarity relationship that one of the two poles is cathode and the other is an anode, and an AC driving method in which polarity relationship changes alternatively. In the AC driving method, it is possible to drive the discharge lamp in a broad driving frequency band (speed of polarity change) such as from several dozen hertz to several megahertz.

As to a structure of the power feeding apparatus for supplying discharge current to the discharge lamp, in the power feeding apparatus for AC drive, an inverter for polarity inversion is added to the downstream side of a ballast circuit such as a chopper circuit of the power feeding apparatus for DC drive.

Since, roughly speaking, the function of the power feeding apparatus and the operation of the discharge lamp in the DC driving method are the same those in the AC driving method except for those of the inverter, description of an example of DC driving method will be given below.

At the beginning of an initial sequence of the power feeding apparatus, voltage which is so-called unloaded release voltage is applied to the discharge lamp. A starter for generating high voltage is operated and a high voltage is applied between the electrodes of the discharge lamp, thereby, dielectric breakdown takes place in the discharge space, based on which the discharge starts. When the dielectric breakdown is successful, glow discharge takes place, following the dielectric breakdown.

FIG. 13 is a graph showing relationship between discharge lamp voltage (VL) and discharge lamp current (IL). The relationship between discharge lamp voltage (VL) and discharge lamp current (IL) will be explained below.

In general, voltage of glow discharge is higher than that of arc discharge. In the glow discharge, current density of the glow discharge is low as shown as, for example, a point (J00) in FIG. 13.

In the glow discharge period, when the electrodes, specifically, the cathode, is sufficiently heated to a temperature at which termionic discharge is possible, the discharge form changes from the glow discharge to the arc discharge.

Since the discharge lamp voltage is low such as about 10 V just after the discharge form changes from the glow discharge to the arc discharge, excessive large current is required to supply rated apparent power at that time.

As shown as a point (J02) in FIG. 13, usually, a circuit of the power feeding apparatus is controlled so that only a smaller amount of discharge lamp current than a certain targeted level of a current limit value (IL0) flows through the discharge lamp.

Although the discharge lamp voltage is low when the arc discharge starts, as the discharge lamp rises in temperature, the discharge lamp voltage increases, as shown as an arrow (Y03) in FIG. 13., to a point (J03) so that the rated apparent power can be applied to the discharge lamp with the discharge lamp current within the range of the current limit value.

In the graph shown in FIG. 13, a constant power characteristic line (Fp0) shows a condition that a power applied to the discharge lamp equals to the rated apparent power value, that is, a condition that a product of the discharge lamp voltage (VL) and the discharge lamp current (IL) is constant. When the discharge lamp current (IL) is less than the current limit value, the circuit of the power feeding apparatus is controlled so that the relationship between the discharge lamp voltage (VL) and the discharge lamp current (IL) is located roughly on the constant power characteristic line (Fp0).

When the temperature of the discharge lamp further rises, the relationship between the discharge lamp voltage (VL) and the discharge lamp current (IL) changes along the constant power characteristic line (Fp0) in the direction shown as an arrow (Y04) in FIG. 13. Ultimately, the discharge lamp voltage rise is saturated and the relationship reaches the static state as shown as a point (J04) in FIG. 13.

It is noteworthy that there is little freedom of setting of the current limit value (IL0). Since a switching device such as FET, semiconductor devices such as diodes etc. and/or power system device such as coils etc. e.g. choke coils etc. which make up the power feeding apparatus, generates considerable heat, it is necessary to use large size switching devices, diodes, and coils, and also it is necessary to make a cooling fan larger, or to reinforce a heat releasing fan. Therefore growth in size or by weight, cost rise of the optical apparatus cannot be avoided.

On the other hand, as shown as the point (J03) in FIG. 13, it takes time to reach the rated apparent power applied to the discharge lamp by discharge lamp current within the current limit value (IL0) if the current limit value (IL0) is made too small. Thus, the waiting time to obtain the practical light intensity from the discharge lamp becomes longer.

Therefore, due to the physical restriction such as cost, size, weight of the optical apparatus and the practical restriction such as the waiting time for which the optical apparatus can be used, the setting range of the current limit value (IL0) is limited.

In the glow discharge, the discharge lamp voltage is high, and in the arc discharge, the discharge lamp voltage is low. Whatever kind of a power feeding apparatus is used, generally, it is difficult to supply power to a high voltage load, and it is easy to supply power to a low voltage load.

Description of an example of a step down chopper type power feeding apparatus for supplying power to a discharge lamp is given below referring to FIG. 14.

In this case, although the power supply capacity of a ballast circuit (Bx') is controlled by duty cycle ratio of on-state of a switching device (Qx), since the discharge lamp voltage is high, high duty cycle ratio is necessary when the discharge lamp (Ld) is in a glow discharge state, even though the discharge lamp current is low.

On the other hand, the discharge lamp (Ld) is in an arc discharge state, since the discharge lamp voltage is low, it is necessary to make duty cycle ratio low even though the current flowing through the discharge lamp is large.

However, the shift from the glow discharge to the arc discharge takes place rapidly. A circuit for controlling the duty cycle ratio of the switching device (Qx) is required to rapidly control the duty cycle ratio from high to low. Since this causes delay, the path of relationship between the discharge lamp voltage and discharge lamp current at the time when the discharge form changes from the glow discharge to the arc discharge is conceptualistically shown as a broken arrow (Y01) in FIG. 13. Therefore, overshoot current which exceeds the current limit value (IL0) often flows through the discharge lamp.

In view of circuit technology, it seems that such controlling delay may be avoided if a rapid response device is used. However, in fact, such a switching circuit can control the capability only at discrete timing in each on/off cycle of the switching device (Qx). Even though response time of the switching device (Qx) is made shorter than the on/off cycle, instability of operation occurs and the problem is not solved.

On the other hand, although it is possible to speed up an operation (that is, shortening the response time) in a stable state by making on/off frequency high, there is limitation in shortening the response time since the higher the frequency of ripple component attributed to on/off switching of the switching device (Qx) is, the more acoustic resonance phenomena of discharge lamp (Ld) easily takes place.

The acoustic resonance phenomena is defined as phenomena in which blinking of light emission takes place or discharge vanishes by plasma's oscillation caused by a stationary wave generated in sonic wave in the discharge space of the discharge lamp by receiving the discharge lamp current perturbation of the ripple component.

The overshoot current damages the discharge lamp, and specifically, it rapidly enhances fusion or evaporation of cathode materials. The evaporated cathode materials attaches to an inner surface of the discharge lamp case and blackens the inner surface of the discharge lamp. As a result, permeability rate is impaired and the life span of the discharge lamp may be shortened.

Since the life span is shortened especially at starting of an lamp operation, the life span of the discharge lamp is shortened depending on the number of lighting on and off In recent years, to prevent global warming, energy saving is desired. As to optical apparatuses, it is desirable that they are turned off as frequently as possible. However, since, as described above, the life span at shifting to the arc discharge is shortened depending upon the number of lighting on and off, in view of the life span of the discharge lamp, it is advantageous that the discharge lamp is turned off as rarely as possible. However, such usage of the discharge lamp conflicts with the desire of energy saving.

SUMMARY OF THE INVENTION

It is an object of the present invention to prevent from shortening the life span of a discharge lamp at shifting to arc discharge.

The present invention provides a power feeding apparatus for a discharge lamp has an electric supply controlling circuit which controls a current limit value to be a first current limit value until discharge status changes to arc discharge, and after that, controls the current limit value to be a second current limit value, wherein the first current limit value is 70% of the second current limit value or less, and further, for 0.2 ms or greater, the first current limit value is maintained after the discharge status changes to the arc discharge.

The present invention also provides a power feeding apparatus for a discharge lamp having an electric supply controlling circuit which controls a current limit value to be a first current limit value until discharge status changes to arc discharge, and after that, controls the current limit value to change from the first current value to 90% of a second current value for 1 ms or greater, wherein the first current limit value is 70% of the second current limit value or less and further, for 0.2 ms or greater, the first current limit value is maintained after the discharge status changes to the arc discharge.

In FIG. 1, a schematic diagram of a DC driving type power feeding apparatus (Ex) for a discharge lamp according to the present invention is shown.

In the power feeding apparatus, a step down chopper type ballast circuit (Bx) is operated by voltage from a DC power source (Mx) such as PFC etc. In the ballast circuit (Bx), current from the DC power source is turned on and off by a switching device (Qx) such as FET etc. and a smoothing condenser (Cx) is charged through a choke coil (Lx). This voltage is impressed to a discharge lamp (Ld) and current flows in the discharge lamp (Ld).

When the switching device (Qx) is on, the smoothing condenser (Cx) is directly charged and power is supplied to the discharge lamp, a load, by current flowing through the switching device (Qx) and also energy is stored in a choke coil (Lx) in form of current. When the switching device is off, the smoothing condenser is charged through a flywheel diode (Dx) and power is supplied to the discharge lamp (Ld) by the energy stored in the choke coil (Lx) in form of current.

In a starter (Ui), a condenser (Ci) is charged through a resistor (Ri) by discharge lamp voltage (VL). When a gate driving circuit (Gi) is activated, a switching device (Qi) comprising, for example, a thyristor etc. becomes conductive. Thereby, the condenser (Ci) is discharged through the primary winding (Pi) of a transformer (Ki) and high voltage pulse is generated on the secondary winding (Hi) of the transformer (Ki).

The high voltage generated on the secondary winding (Hi) of the starter (Ui) is superimposed onto output voltage of the ballast circuit (Bx) and impressed to the electrodes (E1) and (E2), thereby discharge of a discharge lamp (Ld) can be initiated.

A power feed controlling circuit (Fx) generates a gate driving signal (Sg) having certain duty cycle ratio, and the gate driving signal (Sg) is applied through a gate driving circuit (Gx) to the gate terminal of the switching device (Qx), thereby, current is on/off-controlled by the DC power source (Mx).

Discharge lamp current (IL) flowing between the electrodes (E1) and (E2) of the discharge lamp (Ld) and the discharge lamp voltage (VL) generated between the electrodes (E1) and (E2) are detected by a current detector (Ix) and a voltage detector (Vx) respectively.

The current detector (Ix) may be configured by using a shunt resistor and the voltage detector (Vx) may be simply configured by voltage dividing resistors.

Discharge lamp current signal (Si) from the current detector (Ix) and discharge lamp voltage signal (Sv) from the voltage detector (Vx) are input in the power feed controlling circuit (Fx) and the duty cycle ratio of the gate driving signal (Sg) is controlled by the feedback so that the difference between the discharge lamp current (IL) or the discharge lamp voltage (VL), or lamp power, which is product of the current and voltage and the target value, and a target value thereof is reduced based on discharge status of the discharge lamp (Ld) at that time, that is, non-discharge state, glow discharge state (according to circumstances what-like the glow discharge is), or arc discharge state (according to circumstances what-like the arc discharge is).

The result of an experiment conducted by the inventors showing effects of the present invention is described below referring to FIGS. 3 and 4.

In the experiment, using different power feeding apparatuses, the same kind of lamps were turned on and off. Five hundred (500) cycles of an on/off operation were repeated, each of which comprised a five (5) minutes lamp turning-on period and a five (5) minutes lamp turning-off period.

FIGS. 3 and 4 show attenuation of output light intensity of the discharge lamp during the five hundred cycles.

The case of these discharge lamps used in the experiment contained 15 mg/m$^3$ of mercury, bromine, and argon. The discharge lamp having 150 W rated apparent power was used.

In the discharge lamp (Ld) used in the experiment, an arc area between the electrodes (E1) and (E2) of the discharge lamp (Ld) is located at a focal point of a parabolic mirror made of crystallized glass.

Illuminance of output light of the discharge lamp was measured, at a point corresponding to approximately the center of the luminous flux and also at a distance of 1 meter from the arc area between the electrodes (E1) and (E2) by an illuminometer.

In FIGS. 3 and 4, the vertical axis is illumination maintaining rate when illuminance in initial measurement is regarded as 100%.

The structure of the power feeding apparatus (Ex) is in theory explained in description of a first embodiment as described later.

When a power feed controlling circuit (Fx1) shown in FIG. 7 is used, output relationship between the discharge lamp current (IL) and the discharge lamp voltage (VL) of the power feeding apparatus, that is, output current/voltage characteristic in a period during which the current limit value is maintained to be a first current limit value IL1 until the discharge status changes to the arc discharge, is shown as a characteristic line (Fg1) connecting points (P0a), (P0b), (P0c), (P11) and (P1e) shown in FIG. 2, and the current limit value is changed from the first current limit value to a second current limit value, as shown in an arrow (Y12), after a maintaining period τ1 for the first current limit value IL1 passes from a time when the discharge status changes to the arc discharge.

In such a power feeding apparatus, as shown in FIG. 3, illumination maintaining ratios were obtained at the end of the experiment, varying the first current limit value-second current limit value ratio k (k=IL1/IL2) and the maintaining period τ1.

In this experiment, an average of results obtained by measuring illumination of the two discharge lamps was adopted.

The second current value IL2 of the current limit value was 3.4 A because of the physical and/or practical constraints as described above.

In a comparative experiment, in which conventional power feeding apparatus having the output current/voltage characteristic shown as the characteristic line (Fg0) in FIG. 13 was used, the illumination maintaining ratio was 65% at the end of the experiment.

In FIG. 3, the result of the comparative experiment is shown as k=1 and τ1=0 ms.

From these results of the experiment, it was found that the illumination maintaining ratio was improved in case that the ratio k is 70% (0.7) or less and the improvement was greater in case that the maintaining period τ1 was 0.2 ms or greater.

Therefore, the power feeding apparatus for a discharge lamp according to the first embodiment of the present invention can solve the problem that the life span of the discharge lamp is shortened when the discharge status of the high intensity discharge lamp changes to the arc discharge.

In the conventional power feeding apparatus, the overshooting current as shown as an arrow (Y01) in FIG. 13 is generated. However, according to the present invention, the overshooting current is generated at a state where the first current limit value IL1 of the current limit value which is smaller than the second current limit value is set, it is considered that the overshooting current is restrained as conceptually shown as an arrow (Y11) in FIG. 2.

The structure of the power feeding apparatus (Ex) is in theory explained in description of a second embodiment as described later.

When a power feed controlling circuit (Fx2) shown in FIG. 9 is used, output current/voltage characteristic before the discharge status changes to the arc discharge is shown as a characteristic line (Fg1) as shown in FIG. 2.

However, after the discharge status changes to the arc discharge, when the second current limit value IL2 is changed as shown in an arrow (Y12) in FIG. 2, the current limit value is gradually changed from the first current limit value IL1 to 90% of the second current limit value IL2 for a change period τ2.

In such a power feeding apparatus, as shown in FIG. 4, illumination maintaining ratios were obtained at the end of the experiment, varying the first current limit value-second current limit value ratio k and the change period τ2.

In the measurement results, the change period τ2 has a range because in the power feed controlling circuit (Fx2), although the ratio k is set by a resistor (R12) and the change period τ2 is set by only a condenser (C12), even though the capacitance of the condenser (C12) is fixed, if the resistance value is changed, the change period τ2 to reach 90% of the second current value of the current limit value fluctuates a little within the range shown in FIG. 4.

From this result of the experiment, it was found that the illumination maintaining ratio was improved in case that the ratio k is 70% (0.7) or less and the improvement was greater in case that the change period τ2 was 1 ms or greater.

Therefore, the power feeding apparatus for a discharge lamp according to the second embodiment of the present invention can solve the problem that the life span of the discharge lamp is shortened when the discharge status of the high intensity discharge lamp changes to the arc discharge.

In the conventional power feeding apparatus, the overshooting current as shown as an arrow (Y01) in FIG. 13 is generated. However, according to the present invention, the overshooting current is generated at a state where the current limit value has not sufficiently changed, from the first current limit value IL1 which is smaller than the second current limit value IL2, to the second current limit value IL2 which is greater than the first current limit value IL1, and it is considered that the overshooting current is restrained as conceptually shown as an arrow (Y11) in FIG. 2.

DESCRIPTION OF THE DRAWINGS

The present inventions will now be described by way of example with reference to the following figures in which:

FIG. 3 is a graph showing results of an experiment in which illuminance maintaining rate of the power feeding apparatus for a discharge lamp according to a first embodiment is measured;

FIG. 4 is a graph showing result of experiments in which illuminance maintaining rate of the power feeding apparatus for a discharge lamp according to a second embodiment is measured;

DETAILED DESCRIPTION OF THE INVENTION

The first embodiment of the present invention is described below referring to FIG. 5.

Figure 5:
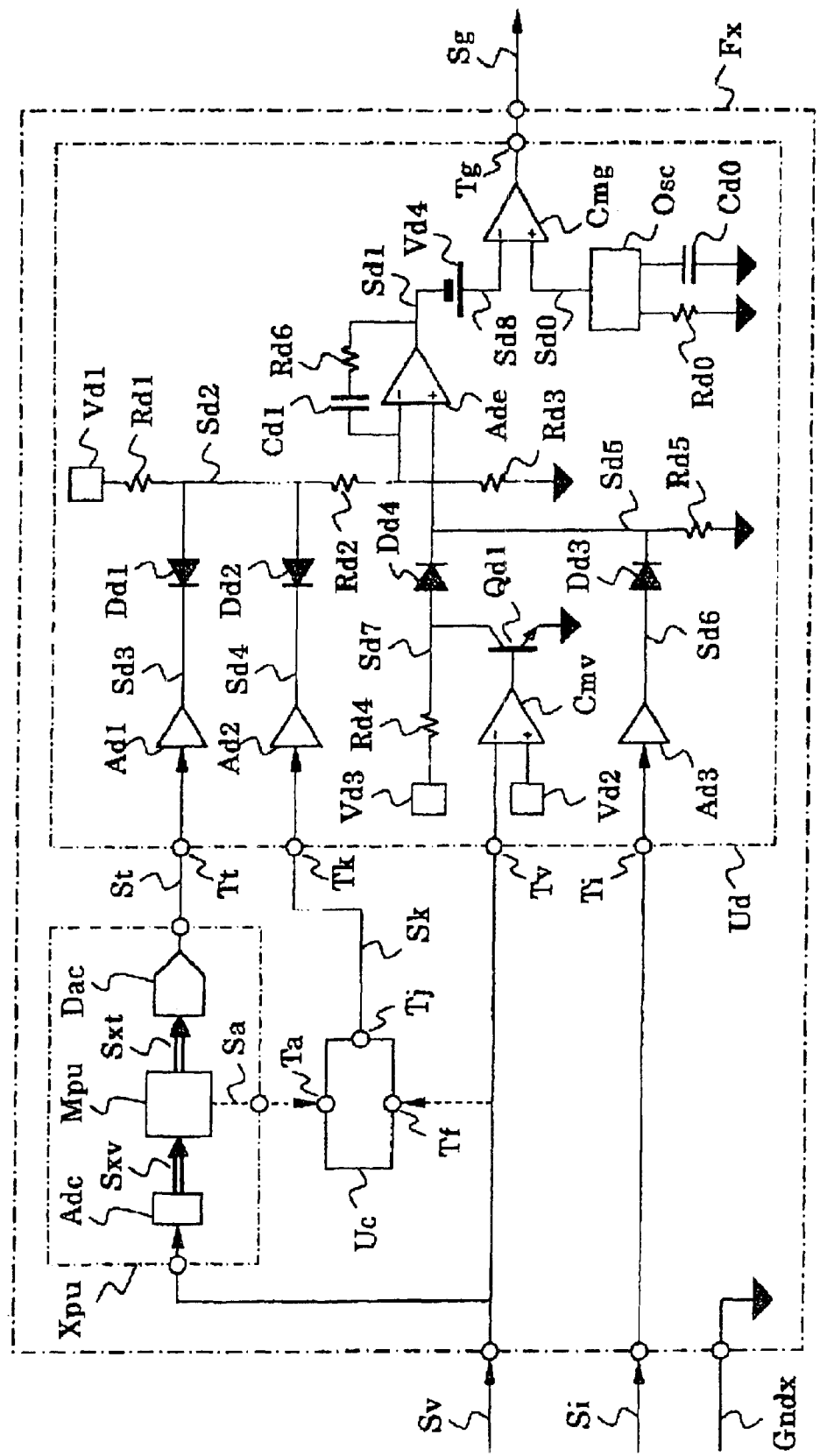
FIG. 5 is a diagram showing an example of a power feed controlling circuit of the power feeding apparatus for the discharge lamp.

FIG. 5 is a schematic diagram of the power feed controlling circuit (Fx).

A discharge lamp voltage signal (Sv) is input into an AD converter (Adc) in an integrated controlling unit (Xpu) and converted into digital discharge lamp voltage data (Sxv) having the appropriate number of digits and then input into a micro processing unit (Mpu).

The micro processing unit (Mpu) includes a CPU, program memory, data memory, clock pulse generator, timer, and/or IO controller for inputting and outputting digital signals, each of which may comprises more than one unit. That is, for example, the CPU may comprise 2 CPUs, the program memory, or data memory may comprise more than one memory.

The micro processing unit (Mpu) generates chopper capability controlling target data (Sxt) for a chopper capability controlling circuit (Ud) (described later) based on a result of calculation referring to the discharge lamp voltage data (Sxv) and condition judgment corresponding to the state of the system at the time.

The chopper capability controlling target data (Sxt) is converted by a D/A converter (Dac) into analog chopper capability controlling target signal (St) and is input into the chopper capability controlling circuit (Ud) through a terminal (Tt).

The discharge lamp voltage signal (Sv) is also input into the chopper capability controlling circuit (Ud) through a terminal (Tv). A discharge lamp current signal (Si) is input into the chopper capability controlling unit (Ud) via a terminal (Ti).

Further, a discharge lamp current upper limit signal (Sk) for setting an upper limit of allowable discharge lamp current determined depending on discharge lamp voltage (VL) is generated by a discharge lamp current upper limit signal generating circuit (Uc) and input into the chopper capability controlling circuit (Ud) through a terminal (Tk).

In the chopper capability controlling circuit (Ud), the chopper capability controlling target signal (St) is sent through an amplifier or buffer (Ad1) which is provided if necessary and a diode (Dd1) and the discharge lamp current upper limit signal (Sk) is sent through an amplifier (Ad2) provided if necessary and a diode (Dd2). The diodes (Dd1) and (Dd2) are connected to one end of a pull-up resistor (Rd1). Thus, a chopper driving target signal (Sd2) is generated based upon the chopper capability controlling signal (St) and the discharge lamp current upper limit signal (Sk).

The other end of the pull-up resistor (Rd1) is connected to a standard voltage source (Vd1) having appropriate voltage.

Therefore, one of a signal (Sd3) corresponding to the chopper capability controlling target signal (St) and a signal (Sd4) corresponding to the discharge lamp current upper limit singal (Sk), which is not the larger becomes a selected signal.

That is, even though an integrated controlling unit (Xpu) generates an inappropriate chopper capability controlling signal (St), e.g. in case that the integrated controlling unit (Xpu) generates a signal corresponding to a discharge lamp current (IL) value for achieving the rated apparent power, calculated by dividing constant corresponding to the rated apparent power by discharge lamp voltage data (Sxv), in the chopper capability controlling circuit, the chopper driving target signal (Sd2) is controlled so that the discharge lamp current (IL) does not exceed the discharge lamp current upper limit signal (Sk).

The operation speed of the control through the A/D converter (Adc) and the micro processing unit (Mpu), is slow. Or, to make the operation speed faster, the cost rises. When, for example, discharge status rapidly changes, due to the operational delay, an inappropriate chopper capability controlling target signal (St) can be generated, therefore, it is advantageous to configure the current limit function by hardware in view of protection of the discharge lamp and the power feeding apparatus.

On the other hand, to generate a controlling target signal (Sd5), the discharge lamp current signal (Si) is, through a diode (Dd3) and an amplifier (Ad3) provided if necessary, applied to one end of a pull-up resistor (Rd5), the other end of which is grounded.

Further, the discharge lamp voltage signal (Sv) is compared with voltage of a standard voltage source (Vd2)

having voltage corresponding to unloaded release voltage by a comparator (Cmv). If the discharge lamp voltage signal (Sv) is higher than that of the unloaded release voltage, a transistor (Qd1) is turned off or in an active state, current flows through a resistor (Rd4) and a diode (Dd4) from an appropriate voltage source (Vd3) to the pull-down resistor (Rd5), thereby, the level of the controlling target signal (Sd5) is increased.

On the other hand, when the discharge lamp voltage signal (Sv) is lower than the unloaded release voltage, since the transistor (Qd1) is turned on and the current from a standard voltage source (Vd3) is shorted, the discharge lamp current signal (Si) becomes the controlling target signal (Sd5).

That is, in the circuit comprising the pull-down resistor (Rd5), the diode (Dd3), the diode (Dd4), of the signals (Sd6) and (Sd7) on the anode side of these diodes (Dd3) and (Dd4), voltage which is not the lower is selected and applied to the pull-down resistor (Rd5).

In the comparator (Cmv), by inserting a positive feedback resistor between the output terminal and a non-inverting input terminal it is possible for the comparator to have hysteresis characteristic in the comparison operation, and therefore, it is possible to prevent oscillation phenomenon not intended at the time when the comparison output changes.

As such, even though output current almost stops flowing and the discharge lamp current signal (Si) is almost not input, if the discharge lamp voltage signal (Sv) starts increasing to more than the unloaded release voltage, the controlling target signal (Sd5) rises rapidly, therefore, the discharge lamp voltage (VL) is always controlled so as to be approximately less than the unloaded release voltage by the hardware.

The chopper driving target signal (Sd2) is divided by the resistor (Rd2) and the resistor (Rd3) and applied to an inverting input terminal of an operational amplifier (Ade). Since the output signal (Sd1) of the operational amplifier (Ade) is fed back through an integration condenser (Cd1) and a speed-up resistor (Rd6), the operational amplifier (Ade) functions as an error integration circuit to integrate differences between the voltage of the controlling target signal (Sd5) and the voltage of the chopper driving target signal (Sd2) divided by the resistor (Rd2) and the resistor (Rd3).

Figure 6:
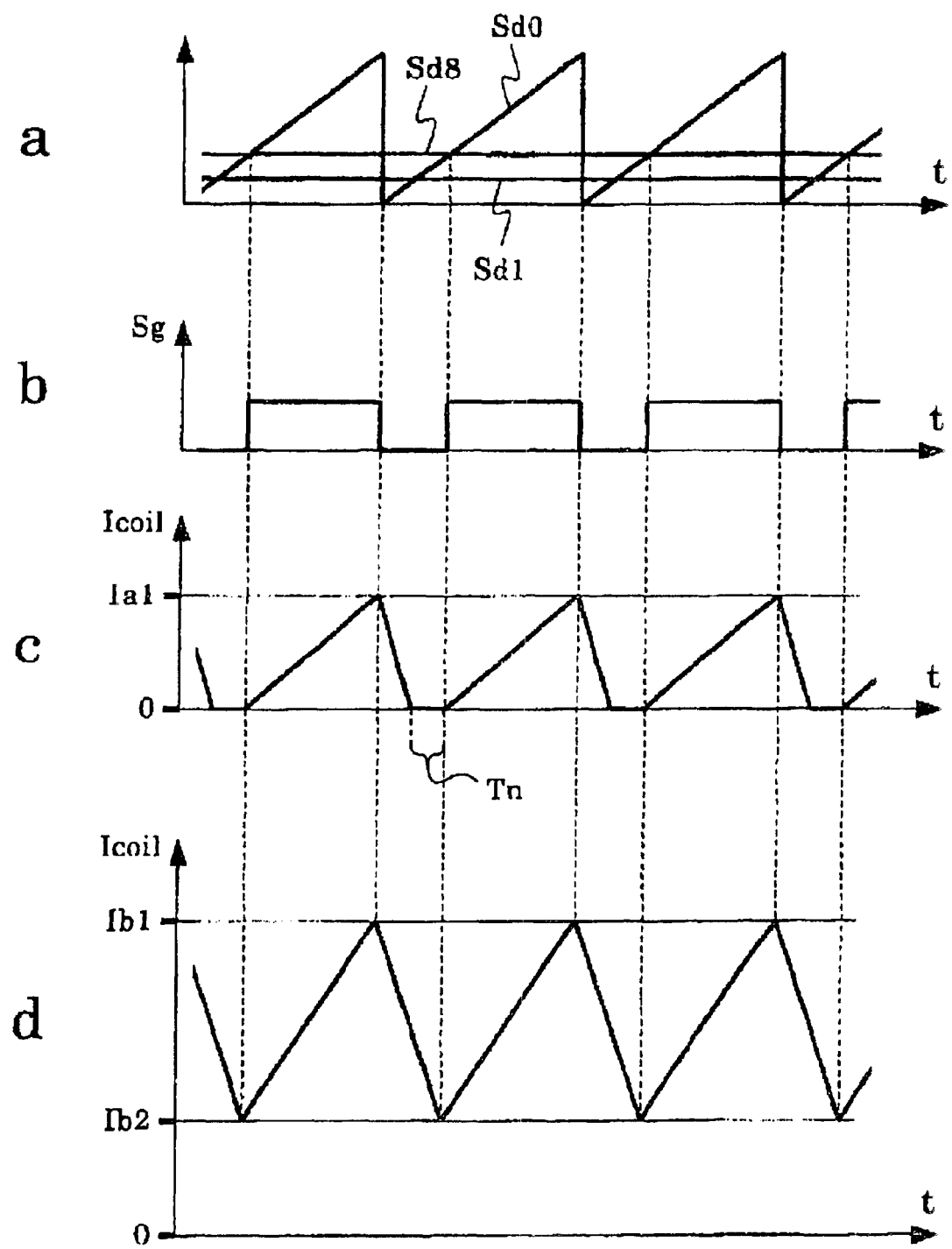
FIG. 6 is a diagram explaining an operation of a step down chopper circuit of the power feeding apparatus for a discharge lamp.

An oscillator (Osc) to which a resistor (Rd0) and a condenser (Cd0) for determining a time constant are connected generates a saw-tooth wave signal (Sd0) shown in FIG. 6. The saw-tooth wave signal (Sd0) and an output (Sd1) of the error integration circuit are compared by the comparator (Cmg).

More precisely, before the comparison, a signal (Sd8) is generated by adding offset voltage (Vd4) to the output signal (Sd1) of the error integration circuit, and the signal (Sd8) is compared with the saw-tooth wave signal (Sd0).

A gate signal (Sg) that becomes high when the voltage of the saw-tooth wave signal (Sd0) is higher than that of the signal (Sd8), a gate signal (Sg) is generated and output from the chopper capability controlling circuit (Ud) through a terminal (Tg).

As described above, since the signal (Sd8) is one in that the offset voltage is added to the output signal (Sd1) of the error integration circuit, even though the output signal (Sd1) is zero (0), the duty cycle ratio of the gate driving signal (Sg) is controlled to be a certain maximum value less than 100 percent, that is, less than the maximum duty cycle ratio DXm.

In FIG. 6, the relationship among the output signal (Sd1) of the error integration circuit, the signal (Sd8) which is generated by adding the output signal (Sd1) to the offset voltage, the saw-tooth wave signal (Sd0) and the gate driving signal (Sg) is shown.

The gate driving signal (Sg) output from the power feed controlling circuit (Fx) is input into the gate driving circuit (Gx) and as a result, a feedback controlling system in which the discharge lamp current signal (Si) and the discharge lamp voltage signal (Sv) are fed back to the operation of the switching device (Qx) is completed.

The chopper capability controlling circuit (Ud) shown in FIG. 5, a commercially available integrated circuit in which the operational amplifier (Ade), the oscillator (Osc), and/or comparator (Cmg) are integrated, TL494™ (Texas Instruments) may be used.

In FIG. 5, the discharge lamp current upper limit signal generating circuit (Uc) in the power feed controlling circuit (Fx) is described above as a block diagram in which an inner structure is not shown.

Figure 7:
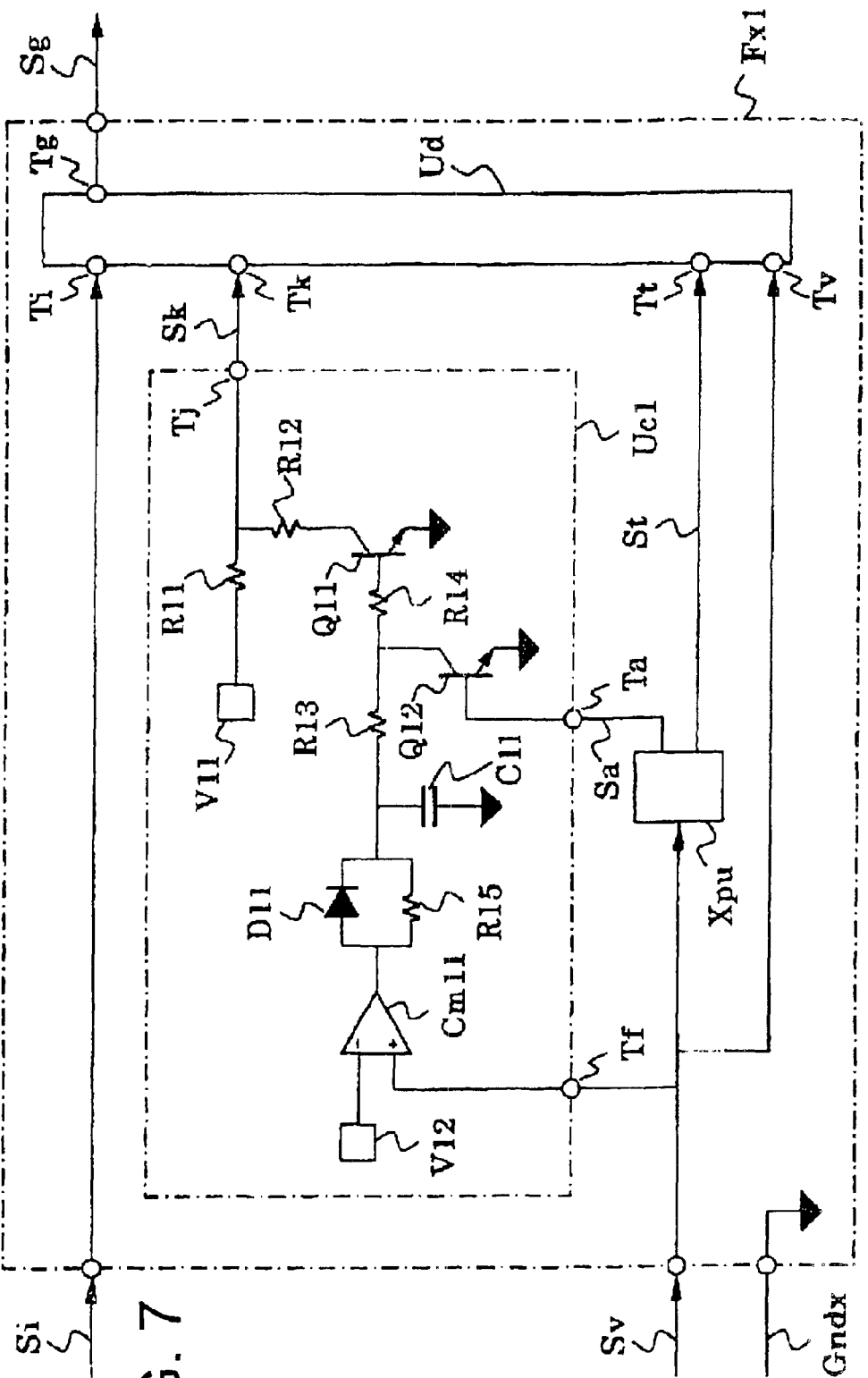
FIG. 7 is a diagram showing an example of the power feed controlling circuit according to the first embodiment of the present invention.

However, in FIG. 7, an example of the power feed controlling circuit (Fx1) including details of a discharge lamp current upper limit signal generating circuit (Uc1) is shown.

At the beginning, a suppression signal (Sa) from the integrated controlling unit (Xpu) is low and therefore, the transistor (Q12) is off.

The discharge lamp voltage signal (Sv) is input through a terminal (Tf) to the discharge lamp current upper limit signal generating circuit (Uc1). By a comparator (Cm11), the discharge lamp voltage signal (Sv) is compared with voltage of a standard voltage source (V12). Since if the discharge lamp voltage signal (Sv) is higher than the voltage of the standard voltage source (V12), the comparator (Cm11) outputs a high level signal, a condenser (C11) is charged through a diode (D11) and since a transistor (Q11) is on through a resistor (R13) and a resistor (R14), voltage of a voltage source (V11) having an appropriate voltage value is divided by a resistor (R11) and a resistor (R12), and output from a terminal (Tj) as the lower discharge lamp current upper limit signal (Sk).

Conversely, since, when the discharge lamp voltage signal (Sv) is lower than the voltage of the standard voltage source (V12), the comparator (Cm11) output a low-level signal, the transistor (Q11) is off or in an active state, and the voltage of the voltage source (V11) is output through the resistor (R11) as a high-level discharge lamp current upper limit signal (Sk).

In this case, the comparator (Cm11) makes the condenser (C11) discharge, but since the diode (D11) is in the reverse direction, the discharge takes place through a resistor (R15), therefore, a high-level discharge lamp current upper signal (Sk) is output after delay determined by time constant which is calculated by product of the capacity of the condenser (C11) and the resistance value of the resistor (R15) from the time when the comparator (Cm11) becomes low.

That is, the portion comprising the diode (D11), the resistor (R15), and the condenser (C11) functions as a delay circuit only when the output signal level of comparator (Cm11) changes from high to low.

Therefore, the discharge lamp current upper limit generating circuit (Uc1) shown in FIG. 7 controls the current limit value based on voltage (VLt1) determined by the voltage of the standard voltage source (V12).

The voltage of the voltage source (V11) and voltage division rate of the resistors (R11) and (R12) are determined so that when the discharge lamp voltage (VL) is higher than the borderline voltage (Vlt1), the discharge lamp current upper limits signal generating circuit (Uc1) shown in FIG. 7 limits the discharge lamp current (IL) to the first current limit value (IL1), and when the discharge lamp voltage (VL) is lower than the borderline voltage (VLt1), the discharge lamp current upper limit signal generating circuit (Uc1) limits the discharge lamp current (IL) to the second current limit value IL2.

Thus, by appropriately choosing these values, it is possible to arbitrarily obtain the first current limit value IL1- second current limit value IL2 ratio k.

To detect whether the state of the lamp is in an arc discharge when the output of the comparator (Cm11) is low, the standard voltage source (V12) is set so that the borderline voltage (VLt1) is lower than the lower limit of the discharge lamp voltage generated in the glow discharge and higher than the lower limit of the discharge lamp voltage at shifting from the glow discharge to the arc discharge.

Further, after the discharge status of the discharge lamp changes from the glow discharge to the arc discharge, the first current limit value (IL1) is maintained for maintaining period τ1 before the second current limit value is set. The capacity of the condenser (C11) and resistance value of the resistor (R15) is set to provide the maintaining period τ1.

It is possible to arbitrarily set the maintaining period τ1 by changing the capacity of the condenser (C11) and the resistance value of the resistor (R15).

Figure 2:
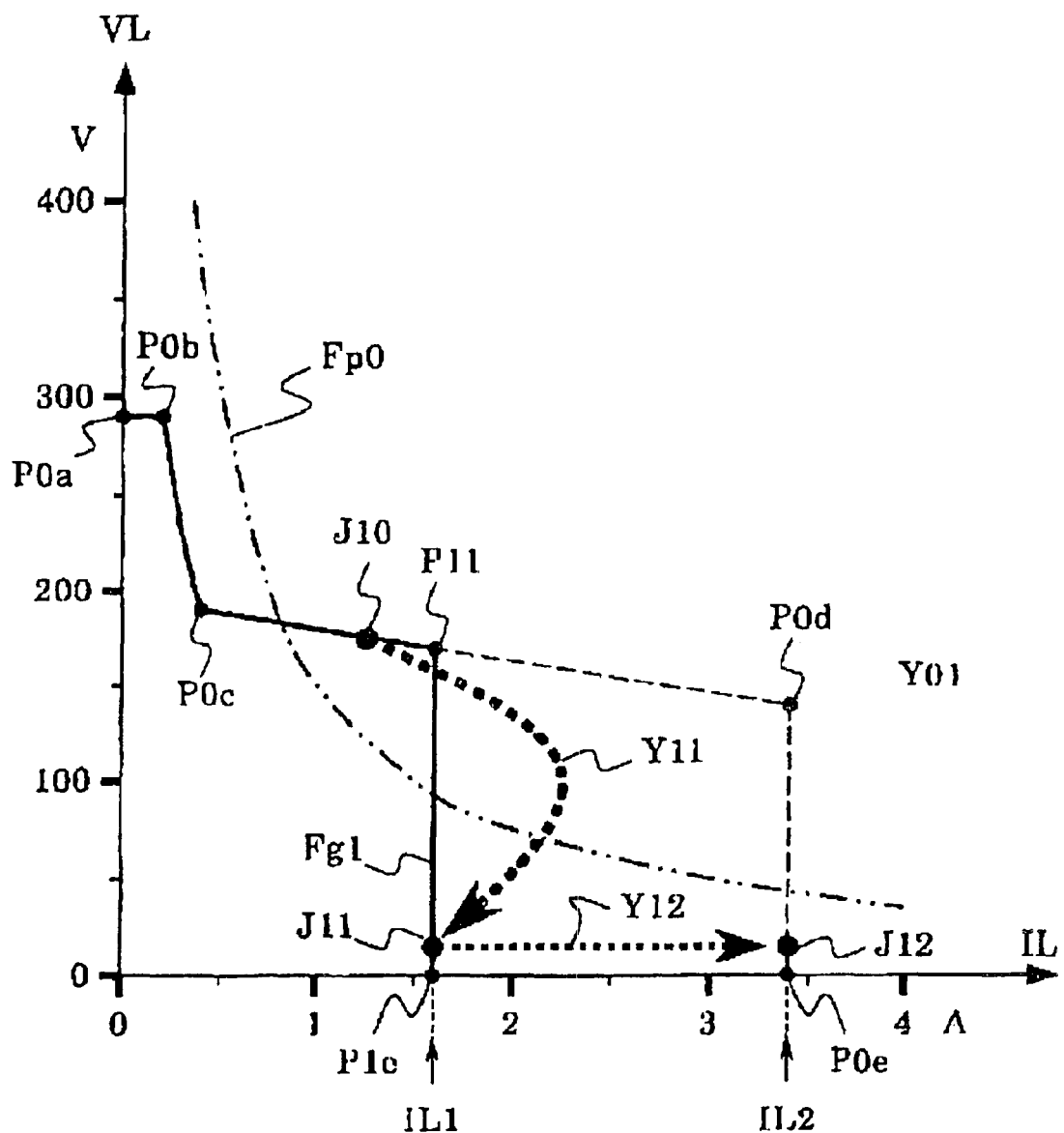
FIG. 2 is a conceptual graph showing the output current/voltage characteristic of the power feeding apparatus of the discharge lamp according to the present invention.

In such a ballast circuit (Bx), in case that in the integrated controlling unit (Xpu) the chopper capability controlling target signal (St) is set to be sufficiently high so that the discharge lamp current upper limit signal (Sk) is selected as the chopper driving target signal (Sd2), the output voltage/ current characteristic in a period, during which the glow discharge takes place, and a period from time just after the arc discharge starts to a time when the maintaining period τ1 passes is shown as a characteristic line (Fg1) by drawing a line connecting points (P0a), (P0b), (P0c), (P11), and (P1e) as shown in FIG. 2 as described above.

Figure 8:
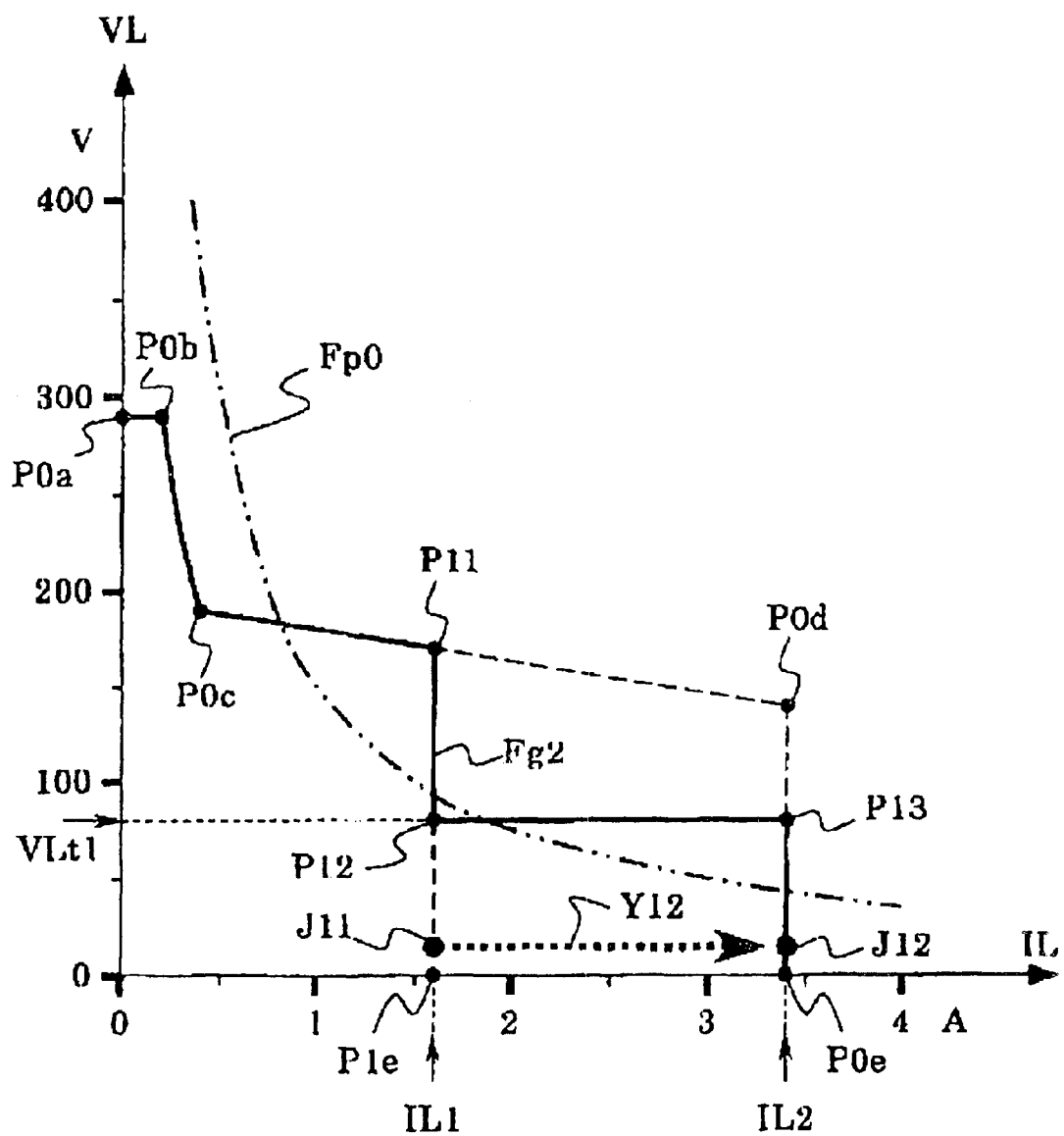
FIG. 8 is a conceptual graph showing an example of the output current/voltage characteristic of the power feeding apparatus for a discharge lamp according to the first and second embodiments of the present invention.

The output voltage/current characteristic of period from time just after the arc discharge starts to a time after the maintaining period τ1 passes is shown as a characteristic line (Fg2) by drawing a line connecting points (P0a), (P0b), (P0c), (P11), (P12), (P13), and (P0e) as shown in FIG. 8.

In FIG. 8, voltage at the points (P12) and (P13) is approximately the same, and the voltage has the value defined by the borderline voltage (Vlt1).

In FIG. 8, current at the points (P11) and (P12) is also approximately the same and the current has the value defined by the first current limit value (IL1).

Further, current at the points (P13) and (P0e) is approximately the same, and the current has the value defined by the second current limit value (IL2).

Description of reasons why the power feeding apparatus (Ex) having the power feed controlling circuit (Fx1) shown in FIG. 7 has the characteristic shown as the characteristic lines (Fg1) and (Fg2) will be given below. Since in general, a step down chopper circuit is used to make output current flow by voltage difference between input voltage and output voltage, the higher the output voltage is, the lower the output current supply capability is. On the other hand, the lower the output voltage is, the higher the output current supply capability is. In other words, the smaller the amount of output current is, the higher output voltage is. On the other hand, the larger the output current is, the lower voltage is output.

The point (P0a) on the characteristic lines (Fg1) and (Fg2) shows a state where the unloaded release voltage is generated.

A flat portion from the point (P0a) to the point (P0b) is created since when current does not flow or only small current flows, as described above, the discharge lamp voltage (Sv) tries to become higher than the unloaded release voltage, thereby, the transistor (Qd1) is turned off or in an active state, and by the feedback controlling function of the chopper capability controlling circuit (Ud), duty cycle ratio of the gate driving signal (Sg) is lowered from the maximum duty cycle ratio (DXmax) and the discharge lamp voltage signal (Sv) is controlled not to exceed the unloaded release voltage.

In the period showing as a portion other than the portion from the point (P0a) to the point (P0b), the transistor (Qd1) is turned on since the discharge lamp voltage signal (Sv) is lower than the unloaded release voltage.

On the other hand, in the period shown as the portion form the point (P0b) to the point (P0d) on the characteristic lines (Fd1) and (Fd2), the controlling target signal (Sd5) corresponds to the discharge lamp current signal (Si). However, as described above, the chopper capability controlling target signal (St) is set to be sufficiently high so as to select the chopper capability controlling target signal (St) as the chopper driving target signal (Sd2). Since as described above, the duty cycle ratio of the gate driving signal (Sg) may not exceed the maximum duty cycle ratio DXmax, the discharge lamp current signal (Si) may not reach the level defined by the chopper driving target signal (Sd2), that is, the discharge lamp current upper limit signal (Sk), the duty cycle fo the gate driving signal (Sg) is maintained at the maximum duty cycle ratio DXmax.

A period shown as the portion from the point (P0b) to the point (P11) on the characteristic lines (Fd1) and (Fd2), especially a period shown as the curved line from the point (P0b) to the point (P0c), corresponds to a state where the step down chopper circuit comprising the switching device (Qx), a choke coil (Lx), and flywheel diode (Dx) is operated in an intermittent mode (non-contiguous mode).

Furthermore, in a period shown as a relatively flat right downward-sloping curve, the step down chopper circuit is operated in a continuous mode. The noncontiguous mode of the step down chopper circuit, as shown as "c" in FIG. 6, means that there is a period (Tn) during which on/off states of the switching device (Qx) is controlled by the gate signal (Sg), and as to a choke coil (Lx), a current value (Icoil) is approximately zero (0). The continuous mode means, as shown as "d" in FIG. 6, that there is no period (Tn) during which the current value (Icoil) of the choke coil (Lx) is zero (0).

In general, in the step down chopper circuit that operates in the non-contiguous mode in which duty cycle is fixed, the output voltage decreases as the output current increases.

According to the theory of simple approximation, the duty cycle ratio is fixed and the output voltage of the step down chopper circuit which operates in the continuous mode does not depend on the output current, and is a fixed value which is calculated by multiplying DC power source (Mx) by the maximum duty cycle ratio Dxmax). However, in an actual step down chopper circuit, since the output voltage decreases as the output current increases, the period shown as the portion from the point (P0c) to the point (P11) is shown as a right down sloping curve (characteristic).

As described above, since the lower the output voltage of the step down chopper circuit is, the higher the output current supply capability is, when the discharge lamp voltage (VL) decreases from the point (P11), the discharge lamp current (IL) tries to exceed the first current limit value IL1. Therefore, since the controlling target signal (SdS) corresponding to the discharge lamp current signal (si) comes to cancel the divided voltage difference of the chopper driving target signal (Sd2) corresponding to the discharge lamp current upper limit signal (Sk), divided by the resistors (Rd2) and (Rd3), the output signal (Sd1) of the error integration circuit increases and the duty cycle ratio of the gate driving signal (Sg) decreases, thereby, the value of the discharge lamp current (IL) is maintained to be the first current limit value (IL1).

In such a manner, the discharge lamp current (IL) whose value is constant in the period from the point (P11) to (P1e) on the characteristic line (Fg1) or the period from the point (P11) to the point (P12) on the characteristic line (Fg2) is generated When the discharge lamp voltage (VL) decreases to less than the borderline voltage (VLt1) from the point (P12) on the characteristic line (Fg2), as described above, the discharge lamp current (IL) is maintained to be the second current limit value (IL2) which is greater than the first current limit value (IL1).

The discharge lamp current whose value is constant in the period shown as a portion from the point (P13) to the point (P0e) is generated in this manner.

A brief description of each of pre-start-up process, start-up process, glow discharge process, change to arc discharge, convergence to arc discharge in a static state and actual control will be given below.

Upon the start-up of the power feeding apparatus, as described above, the integrated controlling unit (Xpu) sets the chopper capacity controlling target signal (St) to be sufficiently high so that as the chopper driving target signal (Sd2) the discharge lamp current upper limit signal (Sk) is selected and therefore, the output current/voltage characteristic is shown as the characteristic line (Fg1) in FIG. 2.

Since at this point, the discharge lamp (Ld) is turned off and the discharge lamp current (IL) does not flow, it is a state in which the unloaded release voltage is generated, that is, a state corresponding to the point (P0a).

As described above, the glow discharge takes place by operating the starter (Ui) and generating dielectric breakdown by impressing high voltage between the electrodes (E1) and (E2).

During glow discharge period the system stays at any point of a high voltage period (usually higher than 150 V), that is, a portion from the point (P0c) to the point (P11) or a portion from the point (P11) to the point (P1e). For example, it stays at the point (J10) for a while and then when the temperature of the electrodes rises, the discharge form changes to the arc discharge.

Thereby, although the discharge lamp voltage is less than the borderline voltage (VLt1), as shown in FIG. 2, the arc discharge continues at the point (J11) where the current limit value is limited to the first current limit value IL1, in a low voltage area (usually less 20 V or less) between the points (P11) and (P1e) on the characteristic line (Fg1), until after the maintaining period τ1 passes.

After the maintaining period τ1 passes, the voltage/current relationship moves to a point (J12), which approximately corresponds to the voltage of the point (J11) in the area between the point (P13) and the point (P0e) on the characteristic line (Fg2) since the current limit value is changed to the second current limit value (IL2).

As such, after the second current limit value is selected, although the discharge state may change from the arc discharge to glow discharge, since by the diode (D11) shown in FIG. 7, the condenser (C11) is rapidly charged, if the discharge state changes back to the glow discharge, the current limit value is immediately c hanged to the first current limit value (IL1).

On the other hand, since as described above, when the lamp discharge state changes to the arc discharge, the discharge lamp voltage (VL) rapidly decreases, the integrated controlling unit (Xpu) that detects the discharge lamp voltage signal (Sv) via the AD converter (Adc), can detect the rapid decrease of the discharge lamp voltage (VL).

Or, as described above, it is possible to detect change from the glow discharge to the arc discharge in the discharge lamp by detecting decrease of the discharge lamp voltage (VL) after appropriate time passes, to prepare for cases where the discharge state of the lamp changes to the arc discharge after discharge state changes to the glow discharge starts from the arc discharge, or the change between the glow discharge and arc discharge is repeated.

When the change to the arc discharge in the discharge lamp is detected, the integrated controlling unit (Xpu) approximately periodically detects the discharge lamp voltage (VL), calculates a target current by dividing set target power by the detected discharge lamp voltage (VL), and initiates the operation to repeatedly set it as the chopper capability controlling target signal (St) in place of the operation of setting the chopper capability controlling target signal (St) to be sufficiently high to select the discharge lamp current upper limit signal (Sk) as the chopper driving target signal (Sd2).

As described above, during the initial period of the arc discharge, the temperature of the lamp does not sufficiently rise, and since the calculated target current exceeds the second current limit value IL2, the target current may not be obtained. However, as time goes on, the temperature of the discharge lamp rises and the calculated target current becomes less than the second current limit value IL2. Thereby, it is possible to supply the set target power to the discharge lamp.

After that, the state of the discharge lamp changes along the constant power characteristic line (Fp0) and, as described above, is settled in the static state.

However, in FIG. 8, part of the characteristic line (Fg2) is located below the constant power characteristic line (Fp0) in the proximity of the point (P12). Since, as described above, of the signal (Sd3) corresponding the chopper capacity controlling target signal (St) and the signal (Sd4) corresponding to the discharge lamp current upper limit signal (Sk), the smaller one is selected as the chopper driving target signal (Sd2) of the chopper capacity controlling circuit (Ud), where part of the characteristic line (Fg2) is located below the constant power characteristic line (Fp0), the characteristic line (Fg2) is given priority over the constant power characteristic line (Fp0), the characteristic line (Fg2) appears.

To prevent such a problem, at time when the change to the arc discharge in the discharge lamp is detected, the integrated controlling unit (Xpu) makes the suppression signal (Sa) high, thereby the transistor (Q12) is on and the transistor (Q11) is prevented from being turned on, as a result, in case of the arc discharge state where the discharge lamp voltage (VL) is higher than the borderline voltage (VLt1), it is possible to prevent appearance of the function that the discharge lamp current (IL) is controlled to the second current limit value (IL2).

Of course, as described above, when there is no condition where the characteristic line of the glow discharge is not located below the characteristic line of the arc discharge, the operation blocking function of the transistor (Q11) by the transistor (Q12) may be omitted.

As such, according to the circuit constant setting method described above, upon design of such power feeding apparatus, the first current limit value-second current limit value ratio k can be set to 70% or less, and the maintaining period τ1 from a time when arc discharge starts to a time when the current limit value is changed from the second current limit value (IL2) to the first current limit value (IL1) can be set to be 0.2 ms or greater.

Thus, as described above, in the power feeding apparatus according to the present invention, it is possible to solve the problem that the life span of the high intensity discharge lamp is shortened when the discharge state of the high-intensity discharge lamp changes to the arc discharge.

Next, description of the second embodiment according to the present invention will be given below.

Figure 9:
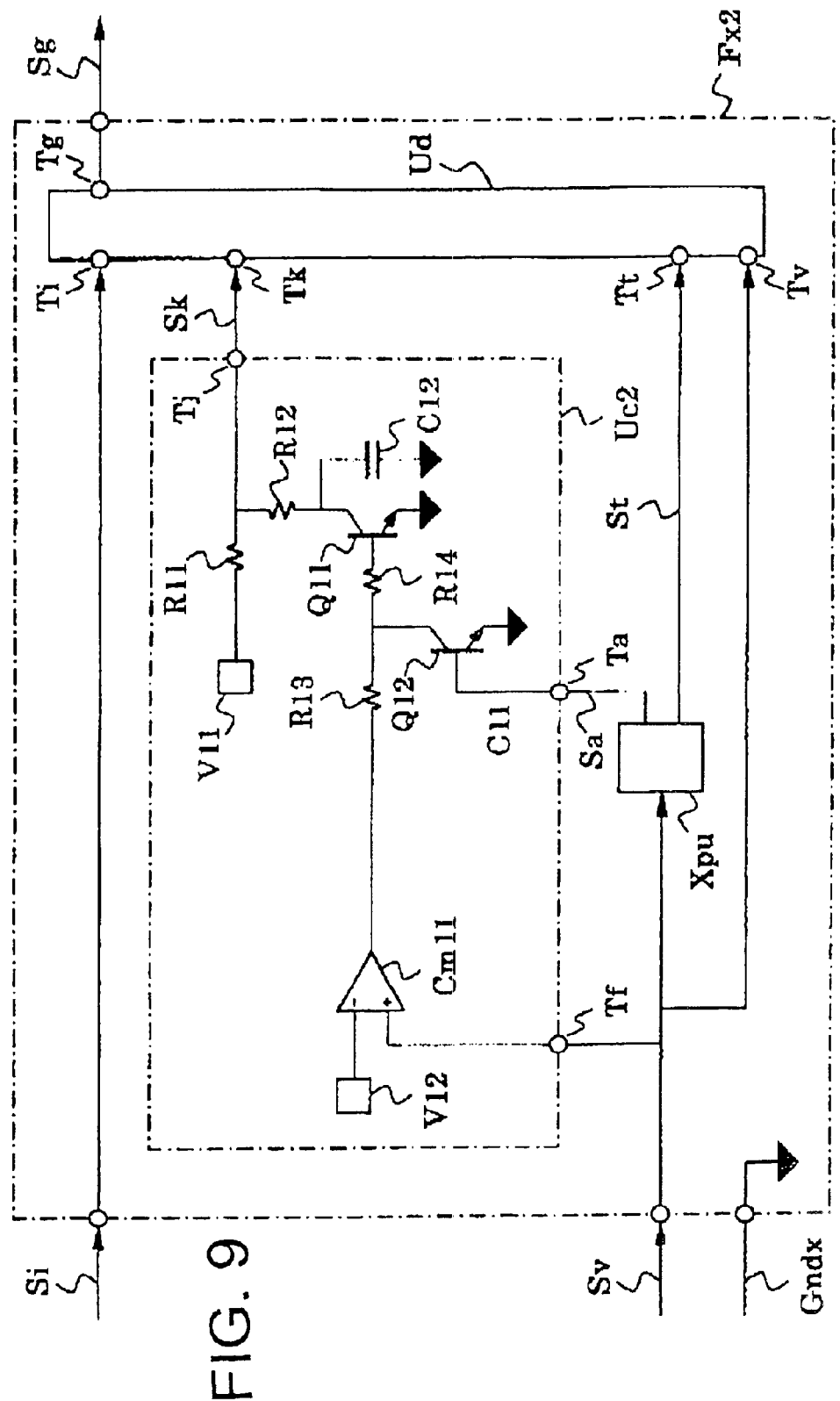
FIG. 9 is a diagram showing an example of a structure of a power feed controlling circuit according to the second embodiment of the present invention.

FIG. 9 is a schematic view of a power feed controlling circuit (Fx2) having a discharge lamp current limit signal generating circuit (Uc2) as the discharge lamp current upper signal generating circuit (Uc) in the power feed controlling circuit (Fx) shown in FIG. 5.

The discharge lamp current upper limit signal generating circuit (Uc2) is the same as that of the discharge lamp current upper limit generating circuit (Uc1) except the diode (D11), the resistor (R15) and the condenser (C11) are removed therefrom and a condenser (C12) connected in parallel to the transistor (Q11) is added thereto.

The operation of such a circuit that is irrelevant to such changes is the same as that of the discharge lamp current upper limit signal generating circuit (Uc1) shown in FIG. 7.

It is necessary to charge the condenser (C12) by resistors (R11) and (R12) in a period from a time when the lamp discharge state changes to the arc discharge, the transistor (Q11) is turned off and the voltage obtained by dividing voltage of the voltage source (V11) by the resistors (R11) and (R12) is generated as the discharge lamp current upper limit signal (Sk), to a time when the voltage of the voltage source (V11) is directly output as the discharge lamp current upper limit signal (Sk). During the charging period, the discharge lamp current upper limit signal (Sk) rises gradually.

While in the discharge lamp current upper limit signal generating circuit (Uc1), the maintaining period τ1 from a time when the discharge state changes to the arc discharge, to a time when the current limit value changes from the first current limit value (IL1) to the second current limit value (IL2) is inserted, in the discharge lamp current upper limit generating circuit (Uc2), when the discharge state of the discharge lamp changes to the arc discharge and the current limit value changes from the first current value IL1 to the second current value IL2, a change period τ2 is provided until the current limit value reaches 90% of the second current value (IL2) so that the current limit value is gradually changed.

On the other hand, the first current limit value-second current limit value ratio k in the second embodiment, is the same as that in the case of the discharge lamp current upper limit signal generating circuit (Uc1), and the value k may be arbitrarily set by appropriately setting the relationship between the voltage of the voltage source (V11), and voltage division rate by the resistor (R11) and the resistors (R12).

Since the condenser charging speed by the resistors (R11) and (R12), is in proportion to the time constant calculated by the product of total resistance value of the resistors (R11) and (R12) and the capacity of the condenser (C12), it is possible to arbitrarily set the change period τ2 by arbitrarily setting the capacity of the condenser (C12).

Figure 10:
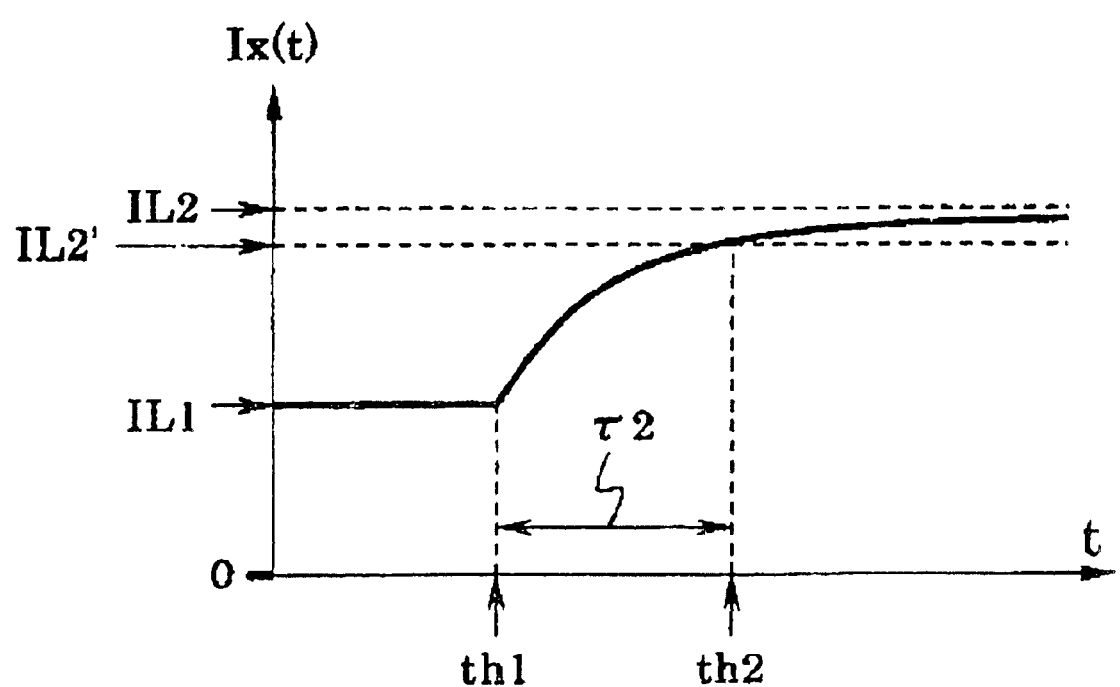
FIG. 10 is a diagram showing an example of a structure of a rush current limiter according to the second embodiment of the present invention

The change period τ2 is defined as a time period during which the second current limit value reaches 90% of the limit value instead of a period during which the second current limit value reaches the limit value. This is because in case that the discharge lamp current upper limit signal generating circuit (Uc2) shown in FIG. 9 is used, the change of the current limit value is shown as Ix(t) depending on time and this function as shown in FIG. 10 exponentially changes as an asymptotic line of the second current limit value (IL2) of the current limit value, and further, a time when the current limit value reaches the second current limit value cannot be precisely defined. Thus, a time when the current value reaches 90% of the second current value IL2 is used.

By such a ballast circuit (Bx), in the integrated controlling unit (Xpu), the chopper capacity controlling target signal (St) is set to be sufficiently high so that the discharge lamp current upper limit signal (Sk) is selected as the chopper driving target signal (Sd2).

The output voltage/current characteristic in the glow discharge is shown as the characteristic line (Fg1) connecting points (P0a), (P0b), (P0c), (P11), and (P1e) as shown in FIG. 2.

The output current/voltage characteristic after sufficient time passes after the change period τ2 in the arc discharge is shown as the characteristic line (Fg2) connecting the points (P0a), (P0b), (P0c), (P11), (P012), (P013) and (P0e) shown in the FIG. 8.

As described above, it is possible to set, the first current limit value IL1-the second current limit value IL2 ratio k, to a desired value which is 70% or less, and also it is possible to set, to 1 ms or greater, the change period τ2 to reach 90% of the second current limit value IL2 from the first current limit value IL1.

Figure 1:
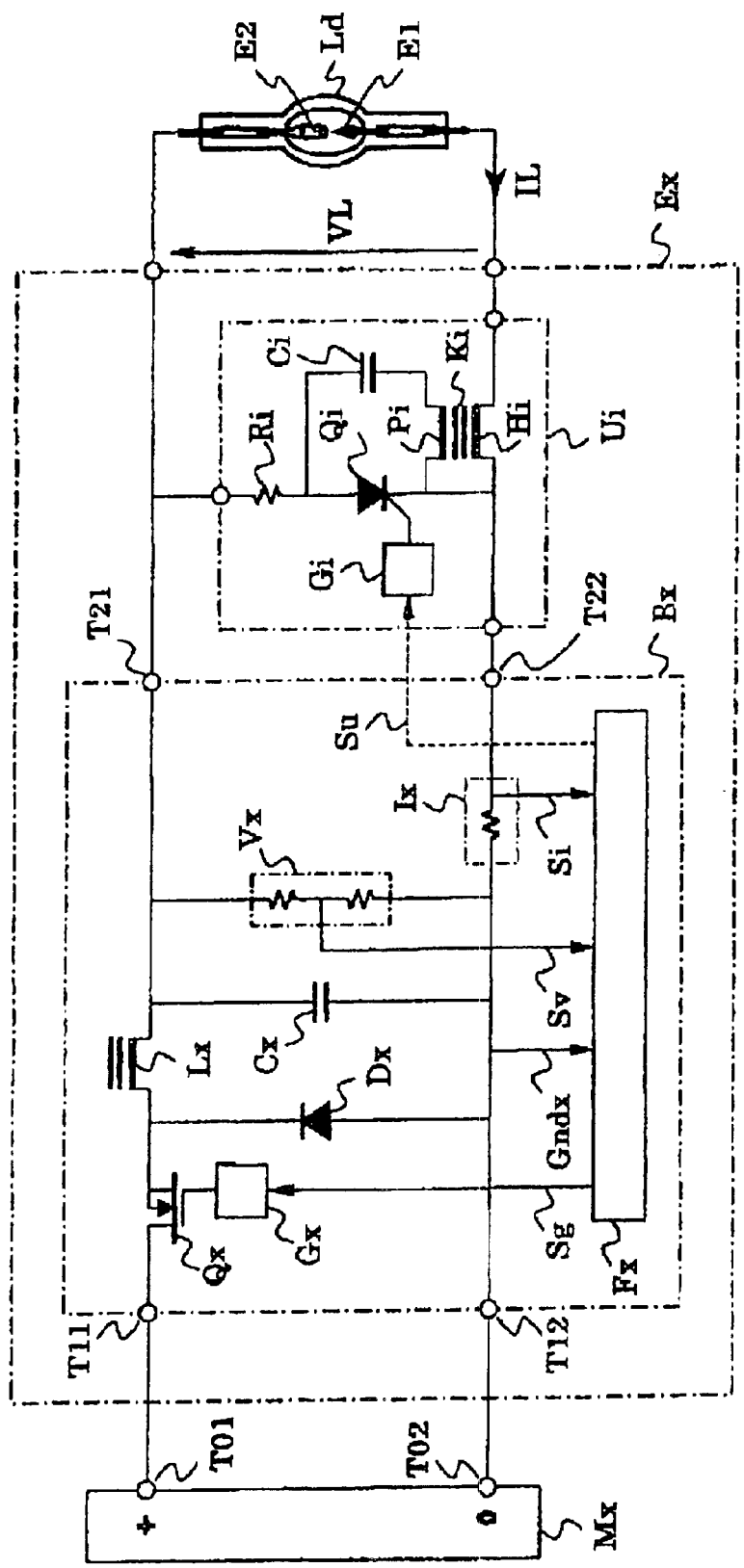
FIG. 1 is a schematic diagram of an inner trigger and DC driving type power feeding apparatus for a discharge lamp according to the present invention.

Thus, the power feeding apparatus having structures shown in FIGS. 1, 5, and 9 can solve the problem that the lamp life span of high-intensity discharge lamp is shortened when the lamp discharge status changes to the arc discharge.

A third embodiment is described below.

In the above-described examples, part of the characteristic line, such as a portion between the point (P11) and the point (P1e) or the point (P0d) and (P0e) shown in FIG. 2 or a portion between the point (P11) and (P12) or the point (P12) and the point (P0e) shown in FIG. 8 is parallel to the VL axis, that is, the current limit value does not depend on the discharge lamp voltage.

In case that part of the characteristic line is not parallel to the VL axis, that is, the current limit value depends on the discharge lamp voltage, the present invention may be effectively applied.

Figure 11:
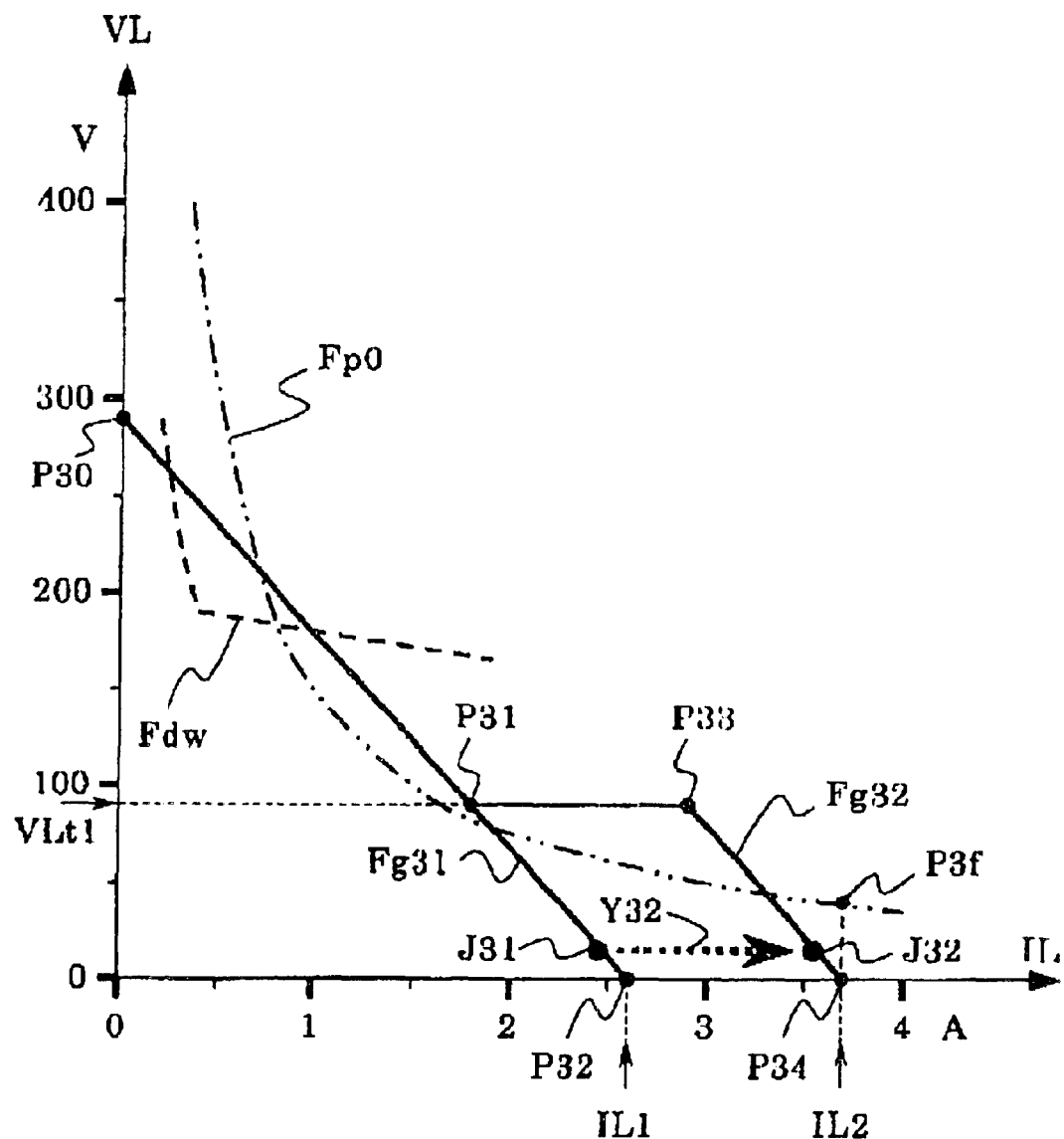
FIG. 11 is a graph showing an example of the output current/voltage characteristic of the power feeding apparatus for a discharge lamp according to the third embodiment of the present invention.

In case hat for Example, as shown in FIG. 11, the output current/voltage characteristic before the discharge state changes to the arc discharge is shown as a characteristic line (Fg31) connecting between a point (P30) and a point (P32) and after the discharge status changes to the arc discharge, even though the output current/voltage characteristic is shown as a characteristic line (Fg32) connecting points (P30), (P31) and (P34), since the discharge lamp current is in effect controlled by the current value corresponding to a point (P32) after the discharge status changes to the arc discharge, it is possible to apply these current limit values as the first current value IL1 and the second current value IL2.

Since the discharge lamp voltage is low during the initial period of the arc discharge, in view of the current/voltage characteristic, the discharge lamp voltage may be regarded as zero (0) and there is in effect no difference even though the discharge lamp current is controlled by the first current limit value IL1 or the second current limit value IL2.

Figure 12:
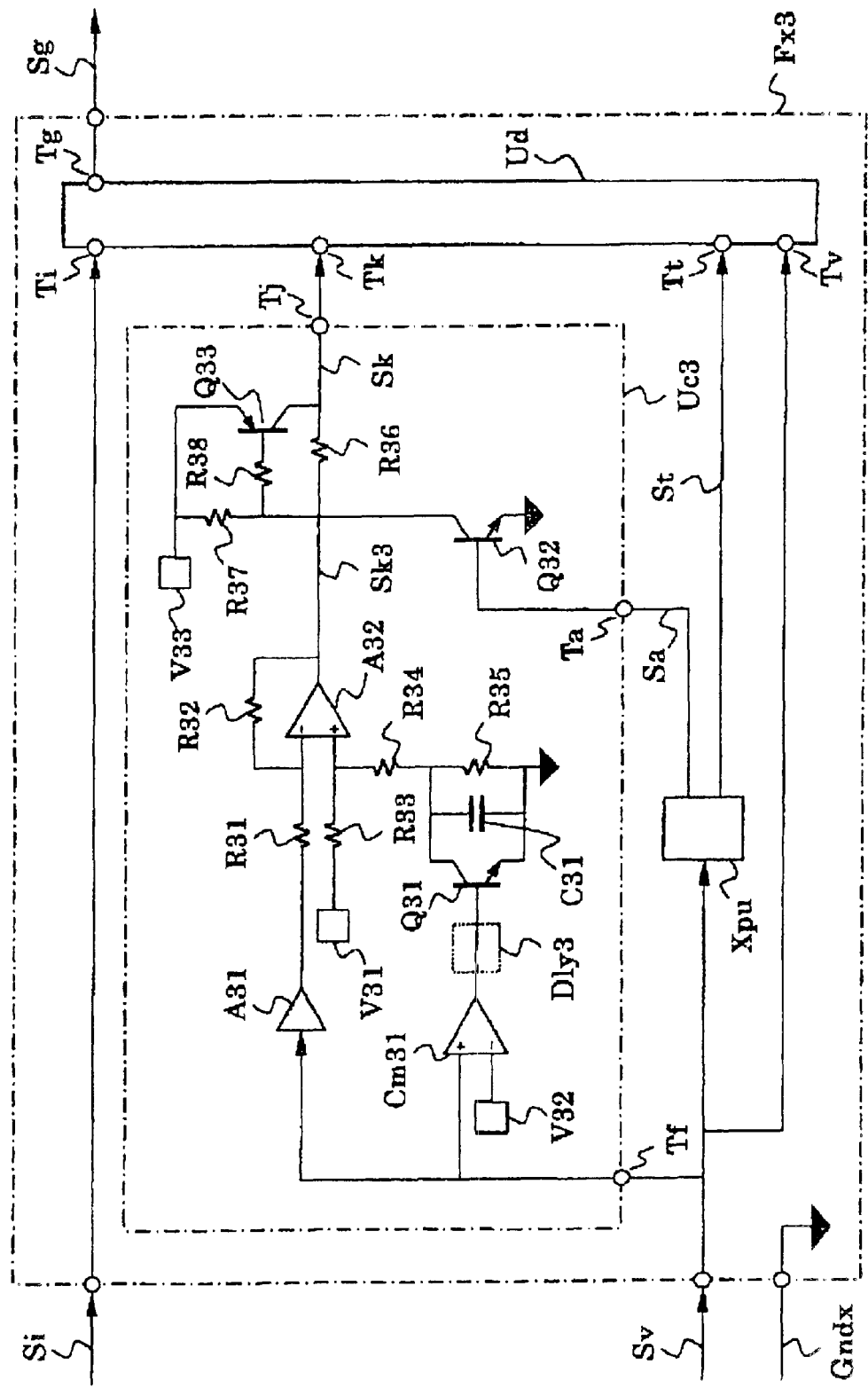
FIG. 12 is a diagram showing an example of a structure of a power feed controlling circuit according to the third embodiment of the present invention.
Figure 13:
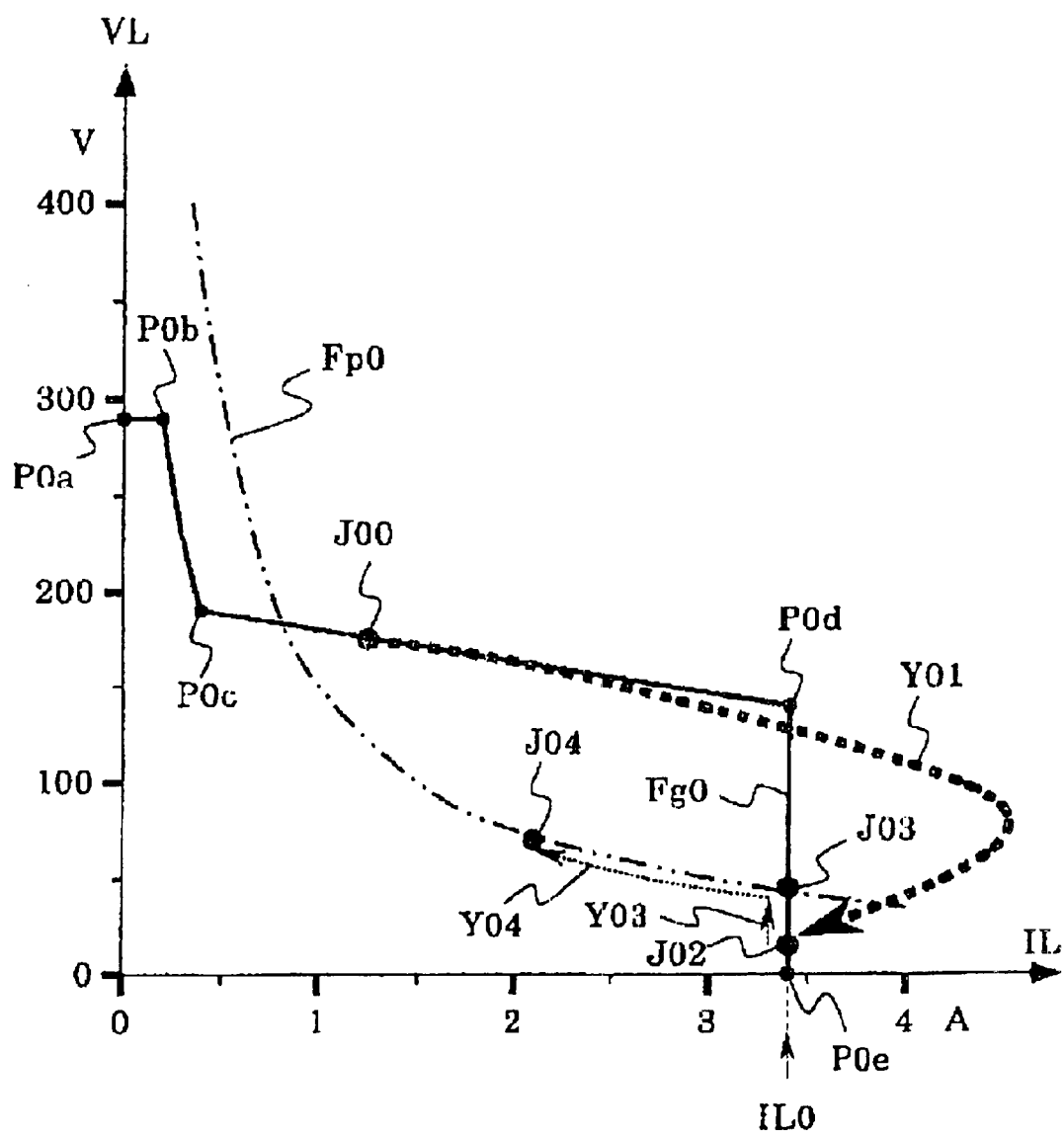
FIG. 13 is a conceptual graph showing a comparative example of the output current/voltage characteristic of the power feeding apparatus.
Figure 14:
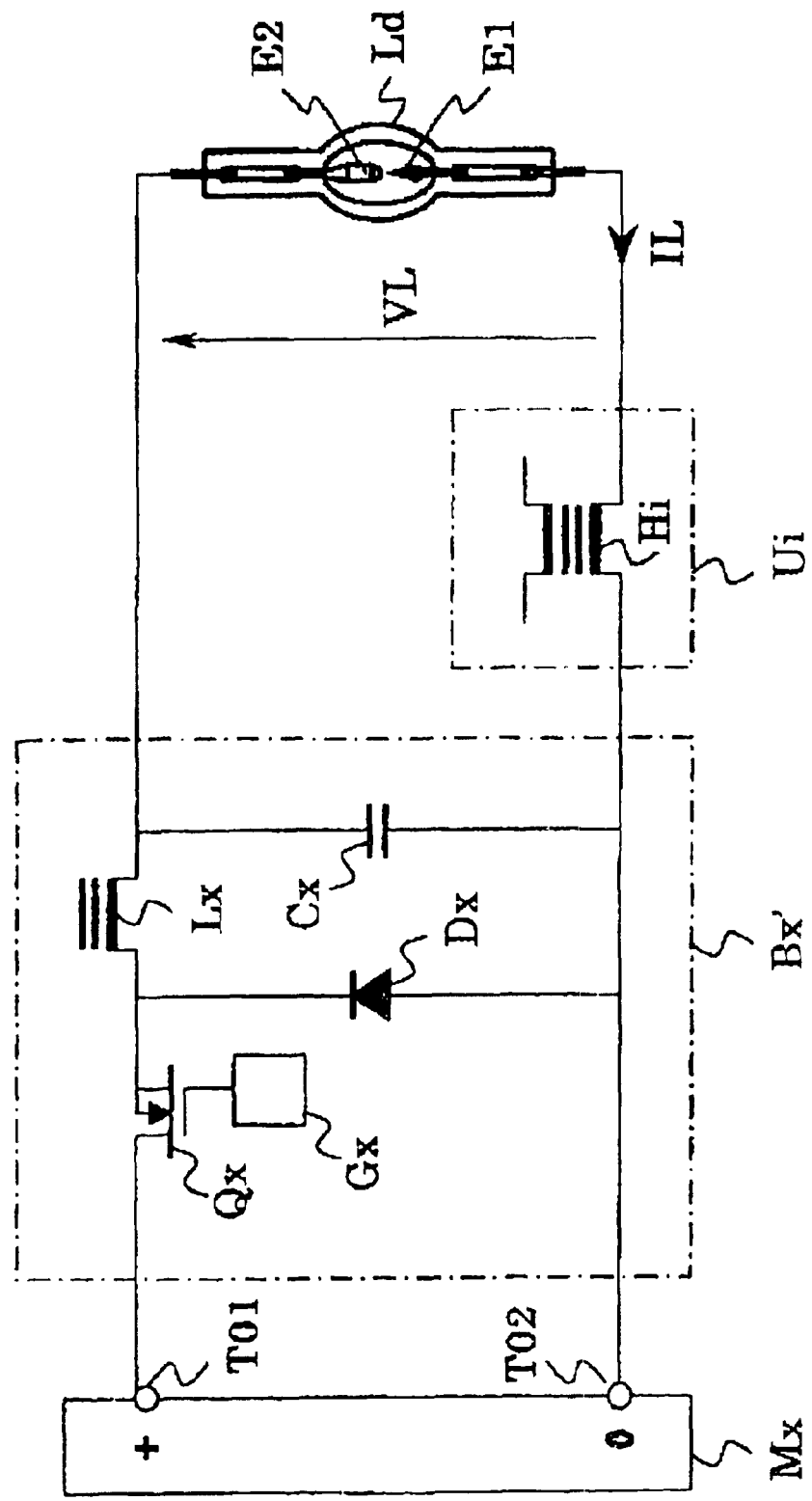
FIG. 14 is a schematic diagram showing a conventional power feeding apparatus for a discharge lamp.

In FIG. 12, a discharge lamp current upper limit signal generating circuit (Uc3) in a power feed controlling circuit (Fx3) corresponds to the discharge lamp current upper limit signal generating circuit (Uc) in the power feed controlling circuit (Fx) in FIG. 5. The discharge lamp current upper limit signal generating circuit (Uc3) in FIG. 12 is detail description of the discharge lamp current upper limit generating signal (UC) and except for the discharge lamp current upper limit signal generating circuit, the power feed controlling circuit (Fx3) is simplified.

A discharge lamp voltage signal (Sv) is sent to the discharge lamp current upper limit signal generating circuit (Uc3) via the terminal (Tf). The signal (Sv) is compared with the voltage of the standard voltage source (V32) by the comparator (Cm31). Since the transistor (Q31) is on when the voltage of the discharge lamp voltage signal (Sv) is higher than the voltage of the standard voltage source (V32), the resistor (R35) is shorted, and the resistance value connected to the ground from the non-inverting input terminal of the operational amplifier (A32) is attributed to only the resistor (R34), which is lower one.

On the other hand, since the transistor is off when the voltage of the discharge lamp voltage signal (Sv) is lower than the voltage of the standard voltage source (V32), the resistor (R35) is not shorted and the resistance value connected to the ground from the non-inverting input terminal is attributed to the sum of the values of the resistors (R34) and (R35), which is higher one.

As to the comparator (Cm31), it is possible to prevent unintended oscillation phenomenon which causes changes of comparison outputs, by having hysteresis characteristic to a comparison operation by inserting a positive feedback resistor (not shown) between the output terminal and the non-inverting input terminal.

A standard voltage source (V31) supplying appropriate voltage is connected to the non-inverting input terminal of the operational amplifier (A32) via a resistor (R33).

On the other hand, the discharge lamp voltage signal (Sv) is input to the inverting input terminal of the operational amplifier (A32) via a buffer (A31) which is provided if necessary, and the resistor (R31). Output voltage of the operational amplifier (A32) is fed back to the input terminal of the operational amplifier (A32) via resistor (R32) and as a result, the operational amplifier functions as a differential amplification circuit.

At that time, the output voltage (Eo) of the operational amplifier (A32) is represented as the formula 1.

$$Eo = A + B \cdot F(Ei) - C \cdot Ei$$

Ei represents voltage of the discharge lamp voltage signal (Sv). A, B, and C represents positive constant and F(Ei) represents a function of Ei wherein F(Ei) is 0 when the transistor (Q31) is on and F(Ei) is 1 when the transistor (Q31) is off.

The constants A, B, and C is calculated based on the resistance values of the resistors (R31), (R32), (R33), (R34), (R35), gain of the amplifier or buffer, and voltage value of the standard voltage source (V31).

The output voltage Eo is output via a resistor (R36) from the terminal (Tj) and input to the chopper capability controlling circuit (Ud) as the discharge lamp current upper limit signal (Sk).

As obvious from the formula 1, the discharge lamp current upper limit signal (Sk) is linearly low in an area where the transistor (Q21) is on and off as the discharge lamp voltage (VL) is high.

Since the output voltage of the ballast circuit (Bx), that is, the discharge lamp voltage (VL) is ultimately controlled not to exceed the unloaded release voltage by the comparator (Cmv), when the discharge lamp voltage (VL) is appropriate voltage higher than the unloaded release voltage on the condition in which the transistor (Q31) is on, it is understood that it is good for the discharge lamp current upper limit signal (Sk) to control the discharge lamp current (IL) to 0 A (Zero Ampere).

If on the condition in which the transistor (Q31) is on, the discharge lamp voltage (VL) changes to the unloaded release voltage, and the discharge lamp current upper limit signal (Sk) controls the discharge lamp current (IL) to 0 A (Zero Ampere), the circuit for controlling not to exceed the unloaded release voltage such as the comparator (Cmv) and the transistor (Qd1) may be omitted.

To set the discharge lamp current limit values, that is, the first current limit value IL1 and the second current limit value, the constant values A, B, and C for the formula 1 are determined so that the discharge lamp current upper limit signal (Sk) controls the discharge lamp current (IL) to the first current limit value IL1 of the current limit value on the condition in which the transistor (Q31) is on, and the discharge lamp current upper limit signal (Sk) controls the discharge lamp current (IL) to the second current limit value IL2 of the current limit value on the condition in which the transistor (Q31) is off.

It is possible to set desirably the first current limit value IL1-second current limit value IL2 ratio k by appropriately setting the relationship.

On the other hand, although the standard voltage source (V32) is determined so that the threshold of the comparator (Cm31) is the borderline voltage VLt1, since the condenser (C31) is provided in parallel to the transistor (Q31) which is controlled by the output signal of the comparator (Cm31), as well as the function of the condenser (C12) in the discharge lamp current upper limit signal generating circuit (Uc2) shown in FIG. 9, the discharge lamp current upper limit signal (Sk) rises gradually since it is necessary to charge the condenser (C31) by the resistors (R33) and (R34) during a period changing from the condition in which the voltage of the standard voltage source (V31) is divided by synthesized resistor of the resistors (R34) and (R35) and the resistor (R33) after the lamp discharge condition changes to the arc discharge and the transistor (Q31) is off, to the condition in which the voltage is divided by the resistors (R34) and (R33).

Thus, in the discharge lamp current upper limit signal generating circuit (Uc3), since the first current limit value IL1 of the current limit value is gradually changed to the second current limit value IL2 upon the shift to the arc discharge, it is possible to set the change period τ2 to reach 90% of the second current limit value of the current value limit value to a desirable value by appropriately setting the capacitance of the condenser (C31).

For the output voltage Eo of the operational amplifier (A32) to be output as the discharge lamp current upper limit signal (Sk), it is necessary for the suppression signal (Sa) sent from the integrated controlling unit (Xup) to be low, for the transistor (Q32) to be off and for the transistor (Q33) to be off by the resistor (R27).

Since when the suppression signal (Sa) from the integrated controlling unit (Xpu) is high, the transistor (Q32) is on and the transistor (Q33) also is on via the resistor (R38), the discharge lamp current upper limit signal (Sk) does not depend on the output voltage Eo of the operational amplifier (A32), and fixed approximately to voltage equal to the voltage of the standard voltage source (V33). So that this voltage value corresponds to the second current limit value IL2 of the current limit value, the voltage of the standard voltage source (V33) is determined.

In such a ballast circuit (Bx), when the chopper capability controlling target signal (St) is set to be sufficiently high so that the discharge lamp current upper limit signal (Sk) is selected as the chopper driving target signal (Sd2), the current/voltage characteristic is shown as a characteristic line (Fg31) connecting the points (P30) and (P32) shown in FIG. 11.

The output current/voltage characteristic is shown as a characteristic line (Fg32) connecting points (P30), (P31), (P33), and (P34) after enough time passes after the discharge status changes to the arc discharge and the change period $\tau 2$ passes.

When the condition in which the discharge status changes to the arc discharge is shown as a point (J31), it gradually changes to a point (J32) as shown an arrow (Y32)

At that time, the voltages at the points (P31) and (P33) are approximately the same and the value thereof is defined by the borderline voltage VLt1.

As explained for the portion from the point (P0b) to the point (P11) shown in FIG. 2, the power supply capability of the characteristic lines (Fg 31) and (Fg32) serves as restraints by the upper limit characteristic (Fdw) of the discharge lamp voltage (VL) attributed to the character as to the condition in which the step down chopper having maximum duty cycle ratio Dmax in the duty cycle ratio of the gate driving signal (Sg) is operated in intermittent mode and the characteristic as to the condition in which it is operated in the contiguous mode. However, the problem can be ignored.

When the power feeding apparatus starts, as well as the first embodiment of the power feeding apparatus, the chopper capability controlling target signal (St) is set to be sufficiently high so that the discharge lamp current upper limit signal (Sk) is selected as the chopper driving target signal (Sd2) and at that point the output current/voltage characteristic is shown as the characteristic line (Fg31) shown in FIG. 11.

It is also possible for the integrated controlling unit (Xpu) to turn on the transistors (Q32) and (Q33) so that the discharge lamp current upper limit signal corresponds to the second current limit value IL2 by making the suppression signal (Sa) high as well as the first embodiment of the power feeding apparatus at a time when it is ascertained that the discharge status changes to the arc discharge and shifts to the characteristic line (Fg32).

Thus, after the discharge status changes to the arc discharge, apart from the characteristic line (Fg32) of the output current/voltage characteristic it is possible to shift to the constant power characteristic line (Fp0) along the constant current characteristic line connecting the points (P34) to the point (P3f).

Although such further change of the output current/voltage characteristic is not necessary when prompt shift to the constant power characteristic line (Fp0) is not necessary, the change is necessary when in the regular use area, (that is, an arc discharge area used as a light source except for an area where the emission is not enough after the initial operation or at a starting point,) there is condition in which the output current/voltage relation is below the characteristic line (Fg32).

As described above, it is possible to set, to a desired value which is 70% or less the first current limit value IL1-the second current limit value IL2 ratio k, and also it is possible to set, to 1 ms or greater, the change period $\tau 2$ to reach 90% of the second current limit value IL2 from the first current limit value IL1.

Thus, the power feeding apparatus having structures shown in FIGS. 1, 5, and 12 and capable of implementing the output current/voltage characteristic shown in FIG. 11 can solve the problem that the lamp life span of high-intensity discharge lamp is shortened when the lamp discharge status changes to the arc discharge.

In FIG. 12, the discharge lamp current upper limit signal generating circuit (Uc3) in which the condenser (C31) is provided is described as the second embodiment. Instead of the condenser (C31), a delay circuit (Dly3) may be provided to the output of the comparator (Cm31) as a structure for the first embodiment. The delay circuit functions only when the output level of the comparator (Cm31), which is equivalent to the diode (D11), the resistor (R15) and the condenser (C11) in the discharge lamp current upper limit signal generating circuit (Uc1) shown in FIG. 7, changes from high to low.

When the chopper capability controlling target signal (St) is set to be sufficiently high so that the chopper driving target signal (Sd2) is selected, the output current/voltage characteristic is shown as a characteristic line (Fg31) connecting the points (P30), (P32), and (P31) in the period from just after the time when the discharge status changes to the arc discharge to the time when the maintaining period $\tau 1$ passes. In these embodiments, the important operations of the present invention such as the implementation of the first current limit value-second current limit value ratio k, the implementation of the maintaining period $\tau 1$ from the time when the discharge status changes to the arc discharge to the time when the current limit value changes from the first current limit value IL1 to the second current limit value IL2, and the implementation of the change period $\tau 2$ from time when the current limit value changes from the first current value IL1 to the second current value IL2 to the time when the current limit value reaches more than 90% of the second current limit value IL2 is achieved by the hardware of the power feeding controlling circuit (Fx).

In the embodiment described above, the functions implemented by program-control of the micro processing unit (Mpu) in the integrated processing unit (Xpu) are detection of change to the arc discharge, output of the suppression signal (Sa) at that time, calculation of discharge lamp current value to implement the rated apparent power corresponding to discharge lamp voltage at each point, setting of the chopper capability controlling target signal (St) via the DA converter (Dac) to implement the rated apparent power and basic sequence control. However, the functions implemented by the program-control of the micro processing unit (Mpu) in the integrated processing unit (Xpu) are not limited to those described above. Those functions simply are examples to explain the present invention and do not substantially limit the present invention.

As long as the performance of the integrated controlling unit is not affected, part of or all of the important operation of the present invention may be implemented by the integrated controlling unit (Xup).

For Example, it is possible to implement the maintaining period $\tau 1$ by the integrated controlling unit (Xup) and it is also suitable to use the integrated controlling unit (Xup) for the implementation of the change time τ2.

In the second embodiment, although exponential temporal response of the current limit value Ix(t) shown in FIG. 10 is explained, this may be implemented by DA-converting digital data generated by the integrated controlling unit (Xup). Those other than the exponential temporal response of the current limit value, for example, linear change, may be arbitrarily accomplished within the scope of the invention.

For example, in the embodiments described above, the chopper capability controlling target signal (St) is set to be sufficiently high so that the discharge lamp current upper limit signal (Sk) is selected as the chopper driving target signal (Sd2) and control of the current limit value is left with the discharge lamp current upper limit signal generating circuit (Uc) until the arc discharge is settled. However, the integrated controlling unit (Uc) may set the temporal response of the current limit value Ix(t) as the chopper capability controlling target signal (St).

This setting is preferably applied to the discharge lamp current upper limit signal generating circuit (Uc1) shown in FIG. 7.

In this case, even though the discharge status changes back to the glow discharge in the middle of the integrated controlling unit (Xpu) setting the temporary response of the current limit value Ix(t) as the chopper capability controlling target signal (St) in sequence after the discharge status changes to the arc discharge, as described above, the transistor (Q11) is immediately turned on when the comparator (Cm11) detect it, and as a result, since the discharge lamp current upper limit signal (sk) generated by the discharge lamp current upper limit signal generating circuit (Uc1) is selected as the chopper driving target signal (Sd2), there is no problem even in case that the speed of response is slow.

Further, as described above, although the integrated controlling unit (Xpu) needs a reset operation for rerunning temporary response of the current limit value Ix(t) by a program when the discharge status changes to arc discharge again, if greater than time necessary for the reset operation is set as a maintaining period τ1 of the discharge lamp current upper limit signal generating circuit (Uc1), the reset operation is certainly carried out since the current limit value is maintained to the first current limit value IL1 until the maintaining period τ1 regardless of the chopper capability controlling target signal (St).

In the embodiments described above, mainly as a structure of the power feeding apparatus for supplying discharge current to the discharge lamp, a DC driving type power feeding apparatus in which discharge takes place by impressing direct voltage to the discharge lamp is explained.

However, since the function of the power feeding apparatus and the operation of the discharge lamp are same as those of an AC driving type power feeding apparatus in starting this type of discharge lamp, the operation of the present invention is carried out in, for example, the AC driving type power feeding apparatus in which discharge takes place by impressing alternative voltage to the discharge lamp, such as one that has a full bridge inverter on the downstream side of the ballast circuit (Bx).

In the embodiments described above, as the ballast circuit (Bx), a step down chopper is described. As the ballast circuit, a DC-DC converter such as a step-up chopper, an inversion chopper (Step down/up chopper) or other type ballast circuits may be used as well for the present invention.

Further, in the embodiments described above, as to the method for starting the discharge lamp, as shown in FIG. 1, the power feeding apparatus in which high voltage of the starter (Ui) is impressed between the electrodes (E1) and (E2) is described. However, an outside-trigger type power feeding apparatus in which voltage is impressed between one of the electrodes (E1) and (E2) and an outer surface of discharge space surrounding portion the lamp case may be used for the present invention as well.

The structure of the circuit described above, is basic to explain the operation or function of the power feeding apparatus for the discharge lamp. Therefore, the present invention is premised on creative changes of details as to the circuit operations such as polarity of the signals, specific circuit's element selections, omissions or changes based on convenience of procurement or economic reasons, which may be vigorously carried out in designing circuits.

Also, this invention is based on the assumption that structures for protecting circuit elements such as switching elements (FET etc.) from damage factors such as overcurrent, over voltage and overheat, or structures for reducing emitting noises, or conductive noises generated by operations of the circuit elements of the power feeding apparatus, or for keeping them inside the apparatus, such as a snubber circuit, varistor, clamp diode, a rush current limitter (including a pulse-by-pulse type), a noise filter choke coil (common mode or normal mode) or a noise filter condenser may be added to each part of the circuit structure described above.

The structure of the power feeding apparatus of the discharge lamp according to the present invention is not limited to the circuit described above. Further, the output current/voltage characteristic according to the present invention is not limited to the characteristic line described above.

Further, although it is described that the integrated controlling unit (Xpu) in the power feed controlling circuit (Fx) shown in FIG. 5, converts the discharge lamp voltage signal (Sv) corresponding to the discharge lamp voltage (VL) and based on that, sets the chopper capability controlling target signal (St), the discharge lamp current signal (Si) corresponding to the discharge lamp current (IL) may be AD-converted and the chopper capability controlling target signal (St) may be compensated so that the obtained current value agrees with the target current value.

This will enable to provide the power feeding apparatus with high precision or sophisticated function since effect of parameter dispersion of each circuit component can be compensated. On the other hand, for example, it is possible to simplify the power feeding apparatus by providing a simple controlling unit instead of the micro processing unit (Mpu).

According to the present invention, the power feeding apparatus for the discharge lamp can solve the problem that the life span of the high-intensity discharge lamp is shortened when the discharge status changes to arc discharge.

The disclosure of Japanese Patent Application No. 2002-154130 filed on May 28, 2002 including specification, drawings and claims is incorporated herein by reference in its entirety.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A power feeding apparatus for a discharge lamp, comprising:

a voltage detector which detects lamp voltage and generates a lamp voltage signal, a current detector which detects lamp current flowing through the discharge lamp, and generates a lamp current signal, an electric supply controlling circuit which detects that discharge status of the discharge lamp changes to arc discharge, based on the lamp voltage signal and the lamp current signal, and controls the lamp current not to exceed a current limit value, wherein the electric supply controlling circuit controls the current limit value to be a first current limit value until the discharge status changes to arc discharge, and after that, controls the current limit value to be a second current limit value, and wherein the first current limit value is 70% of the second current limit value or less, and further, for 0.2 ms or greater, the first current limit value is maintained after the discharge status changes to the arc discharge.

2. A power feeding apparatus for a discharge lamp, comprising:

a voltage detector which detects lamp voltage and generates a lamp voltage signal, a current detector which detects lamp current flowing through the discharge lamp, and generates a lamp current signal, an electric supply controlling circuit which detects that discharge status of the discharge lamp changes to arc discharge, based on the lamp voltage signal and the lamp current signal, and controls the lamp current not to exceed a current limit value, wherein the electric supply controlling circuit controls the current limit value to be a first current limit value until discharge status changes to arc discharge, and after that, controls the current limit value to change from the first current limit value to 90% of a second current limit value for 1 ms or greater, and wherein the first current limit value is 70% of the second current limit value or less, and further, for 0.2 ms or greater, the first current limit value is maintained after the discharge status changes to the arc discharge.

3. The power feeding apparatus according to claim 2, wherein the electric supply controlling circuit controls the current limit value to gradually change from the first current limit value to 90% of a second current value for 1 ms or greater.

* * * * *